(12) United States Patent
Jiang

(10) Patent No.: US 12,038,677 B2
(45) Date of Patent: Jul. 16, 2024

(54) CAMERA DEVICE

(71) Applicant: ZHEJIANG DAHUA TECHNOLOGY CO., LTD., Zhejiang (CN)

(72) Inventor: Yuepeng Jiang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 248 days.

(21) Appl. No.: 17/649,341

(22) Filed: Jan. 28, 2022

(65) Prior Publication Data

US 2022/0155658 A1 May 19, 2022

Related U.S. Application Data

(63) Continuation of application No. PCT/CN2019/126496, filed on Dec. 19, 2019.

(30) Foreign Application Priority Data

Jul. 29, 2019  (CN) .......................... 201910688763.2
Jul. 29, 2019  (CN) .......................... 201921207647.6

(51) Int. Cl.
*G03B 17/56* (2021.01)

(52) U.S. Cl.
CPC ................................. *G03B 17/561* (2013.01)

(58) Field of Classification Search
None
See application file for complete search history.

(56) References Cited

U.S. PATENT DOCUMENTS

| | | | |
|---|---|---|---|
| 9,307,658 | B2 | 4/2016 | Song et al. |
| 10,073,325 | B2 | 9/2018 | Yang et al. |
| 2016/0186922 | A1 | 6/2016 | Li |
| 2019/0061631 | A1 | 2/2019 | Lockwood et al. |

(Continued)

FOREIGN PATENT DOCUMENTS

| | | |
|---|---|---|
| CN | 2750349 Y | 1/2006 |
| CN | 201118749 Y | 9/2008 |
| CN | 202798938 U | 3/2013 |

(Continued)

OTHER PUBLICATIONS

International Search Report in PCT/CN2019/126496 mailed on Apr. 24, 2020, 5 pages.

(Continued)

*Primary Examiner* — Rodney E Fuller
(74) *Attorney, Agent, or Firm* — METIS IP LLC

(57) ABSTRACT

A camera device is provided. The camera device may include a camera body, a supporting component, and a limiting component. The supporting component may be configured to fix the camera body at a first position relative to the supporting component where the lens works under a normal condition. The limiting component may be mechanically coupled between the camera body and the supporting component. The limiting component may be configured to secure the camera body at a second position relative to the supporting component. The second position relative to the supporting component may be different from the first position relative to the supporting component.

16 Claims, 16 Drawing Sheets

(56) References Cited

U.S. PATENT DOCUMENTS

2023/0023407 A1* 1/2023 Garlock .................. H04N 7/183
2023/0026043 A1* 1/2023 Garlock .................. H04N 23/55

FOREIGN PATENT DOCUMENTS

| | | |
|---|---|---|
| CN | 202834602 U | 3/2013 |
| CN | 204119321 U | 1/2015 |
| CN | 102495514 B | 9/2015 |
| CN | 204795303 U | 11/2015 |
| CN | 206023917 U | 3/2017 |
| CN | 206251190 U | 6/2017 |
| CN | 107786800 A | 3/2018 |
| CN | 107825943 A | 3/2018 |
| CN | 207514505 U | 6/2018 |
| CN | 207706277 U | 8/2018 |
| CN | 208073911 U | 11/2018 |
| CN | 110566762 A | 12/2019 |
| DE | 202004003908 U1 | 5/2004 |

OTHER PUBLICATIONS

Written Opinion in PCT/CN2019/126496 mailed on Apr. 24, 2020, 5 pages.
First Office Action in Chinese Application No. 201910688763.2 mailed on Apr. 7, 2020, 14 pages.
The Extended European Search Report in European Application No. 19939917.1 mailed on Jul. 25, 2022, 8 pages.

* cited by examiner

300

1100

CAMERA DEVICE

CROSS-REFERENCE TO RELATED APPLICATIONS

This application is a continuation of International Patent Application No. PCT/CN2019/126496, filed on Dec. 19, 2019, which claims priority of Chinese Patent Application No. 201910688763.2 filed on Jul. 29, 2019, and Chinese Patent Application No. 201921207647.6 filed on Jul. 29, 2019, the contents of each of which are hereby incorporated by reference in its entirety.

TECHNICAL FIELD

The present disclosure generally relates to a camera device, and more specifically relates to one or more components used for assembling the camera device.

BACKGROUND

As an important tool for image photography, a camera device has been widely used in various application scenarios, e.g., surveillance, security, detection and monitoring, information recognition, etc. In some cases, the camera device includes a plurality of components, e.g., a camera body, a supporting component (e.g., a flange), a hook, at least one fastener, etc. The supporting component is fixed on a fixed object, e.g., a wall, a frame, etc. In assembly of the camera device, an operator needs to connect wires inside the camera body when the camera body suspends on the supporting component by the hook. After completing the wire connection, the supporting component and the camera body may be fixed together by the at least one fastener. In practice, the camera body probably shakes while suspending on the supporting component by the hook, which increases the difficulty for the operator to implement the wire connection and probably decreases the accuracy of the wire connection. Additionally, if the position of the hook is near to an external object, e.g., the fixed object, a wall, etc., the camera body probably collides with the external object and/or is unable to open to a degree to implement the wire connection. In order to avoid the problems, the position of the hook needs to be adjusted to keep a distance away from the external object. The position of the hook may be adjusted by adjusting the orientation of the camera body and/or the supporting component. Since the camera body is connected to the supporting component and the supporting component is fixed on the fixed object, the operator needs to disassemble the supporting component from the fixed object to adjust the orientation of the supporting component and further adjust the orientation of the camera body. The disassembly of the supporting component is cumbersome, resulting in relatively low efficiency for assembling the camera device. Thus, it is desirable to design a camera device that can be efficiently assembled.

SUMMARY

According to one aspect of the present disclosure, a camera device may be provided. The camera device may include a camera body, a supporting component, and a limiting component. The camera body may be configured to accommodate a lens. The supporting component may be configured to fix the camera body at a first position relative to the supporting component where the lens works under a normal condition. The limiting component may be mechanically coupled between the camera body and the supporting component. The limiting component may be configured to secure the camera body at a second position relative to the supporting component. The second position relative to the supporting component may be different from the first position relative to the supporting component.

In some embodiments, the limiting component may include a first hook between the camera body and the supporting component. The first hook may include a groove. The supporting component or the camera body may include a protrusion. The camera body may be secured at the second position relative to the supporting component by fitting the protrusion into the groove.

In some embodiments, the first hook may include a bent part and a connecting part connected to the bent part. The groove may be located at the bent part of the first hook.

In some embodiments, the supporting component may include the protrusion. The connecting part of the first hook may be located at the camera body. The bent part of the first hook may be fixedly connected to the supporting component by fitting the protrusion into the groove.

In some embodiments, the bent part of the first hook may be rotatably connected to the supporting component by withdrawing the groove located at the bent part from the protrusion of the supporting component.

In some embodiments, the groove may be withdrawn from the protrusion by uplifting the camera body.

In some embodiments, a shape of the groove and a shape of the protrusion may be mutually matched.

In some embodiments, the protrusion may have a shape of a bean, a shape of a rounded rectangle, an elliptical shape, or a trapezoidal shape.

In some embodiments, the camera device may further include at least one fastener configured to fasten the camera body at the first position relative to the supporting component.

In some embodiments, the at least one fastener may include at least one second hook. The at least one second hook may be detachably connected to the camera body or the supporting component by gluing, screwing, or a mechanical element.

In some embodiments, each of the at least one second hook may include a bent part and a connecting part connected to the bent part. The bent part of each of the at least one second hook may be detachably connected to the camera body or the supporting component.

In some embodiments, the bent part of each of the at least one second hook may be detachably connected to the supporting component. The connecting part of each of the at least one second hook may be located at the camera body.

In some embodiments, each of the at least one second hook may include an elastic component. The elastic component may be located between the connecting part of each of the at least one second hook and the camera body. The elastic component may be configured to facilitate the connecting part of each of the at least one second hook to detachably connect to the supporting component.

In some embodiments, each of the at least one second hook may include a plate. The plate may be located between the connecting part of each of the at least one second hook and the camera body. A first side of the elastic component may be located at the camera body. A second side of the elastic component may be connected to the plate, thereby reducing friction between each of the at least one second hook and the camera body.

In some embodiments, the at least one fastener may include a clasp, an elastic component, and a clasp fastening component. The elastic component and the clasp fastening component may be located at the supporting component. The clasp may be located at the camera body. The clasp may be fixed on the supporting component through the elastic component and the clasp fastener.

In some embodiments, the elastic component may include a spring.

In some embodiments, the clasp may include a press key configured to secure or release the camera body.

In some embodiments, the at least one fastener may include a screw.

According to another aspect of the present disclosure, a surveillance system may be provided. The surveillance system may include a camera device. The camera device may include a camera body, a supporting component, and a limiting component. The camera body may be configured to accommodate a lens. The supporting component may be configured to fix the camera body at a first position relative to the supporting component where the lens works under a normal condition. The limiting component may be mechanically coupled between the camera body and the supporting component. The limiting component may be configured to secure the camera body at a second position relative to the supporting component. The second position relative to the supporting component may be different from the first position relative to the supporting component.

According to another aspect of the present disclosure, a camera device may be provided. The camera device may include a camera body and a supporting assembly. The camera body may be configured to accommodate a lens. The supporting assembly may be configured to facilitate connection between the camera body and a fixed object. The supporting assembly may include a first supporting component and a second supporting component. The first supporting component may be connected to the fixed object. The second supporting component may be rotatably connected to the first supporting component. The camera body may be mechanically connected to the second supporting component such that an orientation of the camera body with respect to the first supporting component is adjustable with a rotation of the second supporting component relative to the first supporting component.

In some embodiments, the fixed object may include a frame, or a wall.

In some embodiments, the first supporting component may be connected to the fixed object by welding, screwing, embedding, or a mechanical element.

In some embodiments, the supporting assembly may include a plurality of guide protrusions and a plurality of guide grooves. The second supporting component may rotate with respect to the first supporting component through the plurality of guide protrusions sliding along the plurality of guide grooves.

In some embodiments, the plurality of guide protrusions may be spaced from each other along a circumferential direction of the first supporting component.

In some embodiments, the plurality of guide grooves may be spaced from each other along a circumferential direction of the second supporting component.

In some embodiments, a count of the plurality of guide protrusions may be the same as a count of the plurality of guide grooves.

In some embodiments, the count of the plurality of guide protrusions may be 3.

In some embodiments, a central angle between any two of the plurality of guide protrusions may be 120 degrees. A central angle between any two of the plurality of guide grooves may be 120 degrees.

In some embodiments, the second supporting component may include a shaft, and the camera device may include a first hook. The first hook may be configured to connect the camera body to the second supporting component. The first hook may be hooked at the shaft of the second supporting component. The camera body may be adjusted to an orientation where the shaft is kept at a distance away from the fixed object.

In some embodiments, the second supporting component may include at least one stopper protrusion configured to limit a movement between the plurality of guide protrusions and the plurality of guide grooves.

In some embodiments, the camera device may include at least one fastener configured to fasten the first supporting component and the second supporting component.

In some embodiments, the first supporting component may include at least one stud. The second supporting component includes at least one hole. The at least one fastener may screw on the at least one stud through the at least one hole.

In some embodiments, the at least one stud may include multiple studs that are spaced from each other along a circumferential direction of the second supporting component.

In some embodiments, the at least one fastener may include a screw, or a nut.

In some embodiments, the camera device may include at least one second fastener configured to fasten the second supporting component and the camera body.

In some embodiments, the at least one second fastener may include a second hook, a screw, or a nut.

In some embodiments, the second hook may be detachably connected to the camera body or the second supporting component.

In some embodiments, the second hook may include a bent part and a connecting part connected to the bent part. The bent part of the second hook may be detachably connected to the second supporting component. The connecting part of the second hook may be located at the camera body.

In some embodiments, the first supporting component may include a flange or a frame.

In some embodiments, the second supporting component may include a flange, or a frame.

In some embodiments, the camera body may include a chamber configured to accommodate a portion of the first supporting component.

In some embodiments, the camera body may include a dome camera body, a semi-dome camera body, or a gun-shaped camera body.

In some embodiments, the first hook may include a groove. The second supporting component or the camera body may include a protrusion. The connection between the camera body and the second supporting component may be fixed by fitting the protrusion into the groove.

According to another aspect of the present disclosure, a surveillance system may be provided. The surveillance system may include a camera device. The camera device may include a camera body and a supporting assembly. The camera body may be configured to accommodate a lens. The supporting assembly may be configured to facilitate connection between the camera body and a fixed object. The supporting assembly may include a first supporting component and a second supporting component. The first supporting component may be connected to the fixed object. The second supporting component may be rotatably connected to the first supporting component. The camera body may be mechanically connected to the second supporting component such that an orientation of the camera body with respect to the first supporting component is adjustable with a rotation of the second supporting component relative to the first supporting component.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
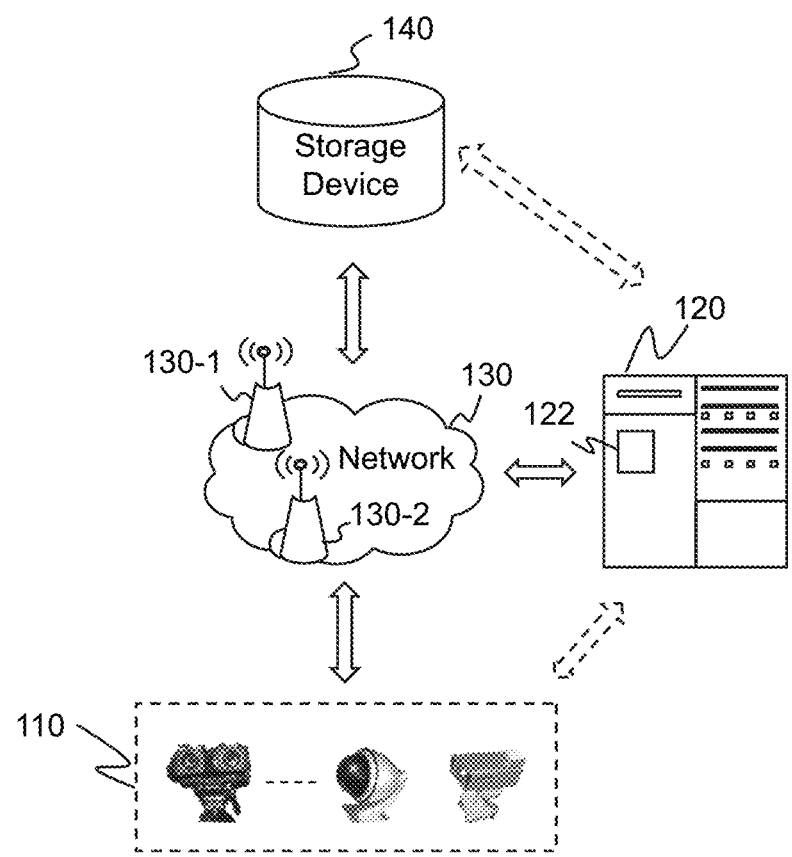
FIG. 1 is a schematic diagram illustrating an exemplary surveillance system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be further understood that the terms "device," "body," "hook," "component," "assembly", etc., when used in this disclosure, refer to one or more parts with one or more specific purposes. However, a structure that may perform a same or similar function compared to a part exemplified above or referred to elsewhere in the present disclosure may be named differently from the present disclosure.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

One aspect of the present disclosure relates to a camera device. The camera device may include at least one supporting component, a camera body, a limiting component (e.g., a first hook), and at least one fastener. The camera body may accommodate a lens, a battery, wires, etc. The supporting component(s) may be connected to a fixed object (e.g., a wall, a frame). An operator may implement wire connection inside the camera body after the camera body is secured to a convenient position by the limiting component. The limiting component may include a groove. The supporting component(s) or the camera body may include a protrusion. The camera body may be secured by fitting the protrusion into the groove such that the camera body may not shake during the wire connection. After completing the wire connection, the operator may uplift the camera body to withdraw the protrusion from the groove, such that the camera body may be rotatably connected to the supporting component(s), thereby facilitating the assembly of the camera body and the supporting component(s). The camera body and the supporting component(s) may be further fixed together by the limiting component and the at least one fastener.

It shall be noted that the coupling between the protrusion and the limiting component (e.g., the first hook) may prevent the camera body from shaking during the wire connection. Besides, when the camera body is uplifted, the limiting component and the camera body may be rotatably connected to the supporting component(s), such that the camber body can easily rotate to a position for assembly with the supporting component(s). Therefore, the efficiency for assembling the camera device may be increased.

According to another aspect of the present disclosure, the camera device may include a camera body, a supporting assembly, a hook, at least one fastener, and at least one second fastener. The camera body may accommodate a lens, a battery, wires, etc. The supporting assembly may include a first supporting component and a second supporting component. The first supporting component may be connected to a fixed object. The second supporting component may be rotatably connected to the first supporting component. Specifically, the first supporting component and the second supporting component may include at least one guide protrusion and at least one guide groove. The second supporting component may rotate with respect to the first supporting component through the at least one guide protrusions sliding along the at least one guide groove. An operator may implement wire connection inside the camera body when the camera body suspends on the second supporting component by the hook. The operator may rotate the second supporting component to change the position of the hook such that the hook may keep a distance away from an external object, e.g., the fixed object. After completing the wire connection, the operator may fix the first supporting component and the second supporting component together by the at least one fastener. The camera body and the supporting assembly may be further fixed together by the hook and the at least one second fastener. In some embodiments, the second supporting component may include a protrusion. The hook may be same as or similar to the first hook as illustrated above and may secure the camera body on the second supporting component during the wire connection.

In practice, during the assembly of the camera device (e.g., the implementation of the wire connection), the hook may be near to an external object, e.g., the fixed object, a wall, etc., such that the camera body may collide with the external object while suspending on the supporting assembly and/or not enough space is provided for the operator to implement the wire connection. The operator may rotate the camera body to an orientation where the hook is kept at a distance from the external object, thereby preventing the camera body from colliding with the external object, and/or providing enough space for the operator to implement the wire connection. In this regard, the assembly of the camera body and the supporting assembly may be implemented flexibly.

FIG. 1 is a schematic diagram illustrating an exemplary surveillance system 100 according to some embodiments of the present disclosure. The surveillance system 100 may capture and/or process images (e.g., digital images) and/or videos of a target scene. The surveillance system 100 may capture images of objects in the target scene. Exemplary objects may include a vehicle, a pedestrian, a road, a building, a tree, a river, or the like, or any combination thereof. In some embodiments, the surveillance system 100 may use the (processed) images and/or videos for face recognition, vehicle recognition, human behavior detection and analysis, etc. The surveillance system 100 may include a camera device 110, a server 120, a network 130, and a storage device 140. The components of the surveillance system 100 may be connected in one or more of various ways. Mere by way of example, as illustrated in FIG. 1, the camera device 110 may be connected to the server 120 through the network 130. As another example, the camera device 110 may be connected to the server 120 directly as indicated by the bi-directional arrow in dotted lines linking the camera device 110 and the server 120. As a further example, the storage device 140 may be connected to the server 120 directly as indicated by the bi-directional arrow in dotted lines linking the storage device 140 and the server 120. As a further example, the storage device 140 may be connected to the server 120 through the network 130.

The camera device 110 may be configured to capture and/or obtain the images and/or videos of the target scene. In some embodiments, the camera device 110 may include at least one supporting component, a camera body, a limiting component (e.g., a first hook), and at least one fastener. The camera body may accommodate a lens, a battery, wires, etc. The supporting component(s) may be connected to a fixed object (e.g., a wall, a frame). In the assembly of the camera device 110, an operator may implement wire connection inside the camera body after the camera body is secured to a convenient position by the limiting component. The limiting component may include a groove. The supporting component(s) or the camera body may include a protrusion. The camera body may be secured by fitting the protrusion into the groove such that the camera body may not shake during the wire connection. After completing the wire connection, the operator may uplift the camera body to withdraw the protrusion from the groove, such that the camera body may be rotatably connected to the supporting component(s), thereby facilitating the assembly of the camera body and the supporting component(s). After the camera body rotates to a position that coincides with the supporting component(s), the camera body and the supporting component(s) may be further fixed together by the limiting component and the at least one fastener.

In some embodiments, the camera device 110 may include a camera body, a supporting assembly, a hook, at least one fastener, and at least one second fastener. The camera body may accommodate a lens, a battery, wires, etc. The supporting assembly may include a first supporting component and a second supporting component. The first supporting component may be connected to a fixed object. The second supporting component may be rotatably connected to the first supporting component. Specifically, the first supporting component and the second supporting component may include at least one guide protrusion and at least one guide groove. The second supporting component may rotate with respect to the first supporting component through the at least one guide protrusion sliding along the at least one guide groove. An operator may implement wire connection inside the camera body when the camera body suspends on the second supporting component by the hook. The operator may rotate the second supporting component to change the position of the hook such that the hook may keep a distance away from an external object, e.g., the fixed object, a wall, etc. After completing the wire connection, the operator may fix the first supporting component and the second supporting component together by the at least one fastener. The camera body and the supporting assembly may be further fixed together by the hook and the at least one second fastener. In some embodiments, the hook may be same as or similar to the first hook as illustrated above and may secure the camera body on the second supporting component during the wire connection.

The server 120 may be a single server or a server group. The server group may be centralized, or distributed (e.g., server 120 may be a distributed system). In some embodiments, the server 120 may be local or remote. For example, the server 120 may obtain images and/or videos stored in the camera device 110, and/or the storage device 140 via the network 130. As another example, the server 120 may be directly connected to the camera device 110, and/or the storage device 140 to access stored images and/or videos. In some embodiments, the server 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 120 may include a processing device 122. The processing device 122 may process information and/or data to perform one or more functions described in the present disclosure. For example, the processing device 122 may process images and/or videos obtained from the camera device 110. In some embodiments, the processing device 122 may include one or more processing engines (e.g., single-core processing engine(s) or multi-core processor(s)). Merely by way of example, the processing device 122 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 130 may facilitate the exchange of information and/or data. In some embodiments, one or more components of the surveillance system 100 (e.g., the server 120, the camera device 110, the storage device 140) may exchange information and/or data with other component(s) of the surveillance system 100 via the network 130. For example, the server 120 may obtain images and/or videos of a target scene from the camera device 110 via the network 130. In some embodiments, the network 130 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 130 may include one or more network access points. For example, the network 130 may include wired or wireless network access points such as base stations and/or internet exchange points 130-1, 130-2, . . . , through which one or more components of the surveillance system 100 may be connected to the network 130 to exchange data and/or information.

The storage device 140 may store data and/or instructions. In some embodiments, the storage device 140 may store data obtained from the camera device 110. In some embodiments, the storage device 140 may store data and/or instructions that the server 120 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more components of the surveillance system 100 (e.g., the server 120, the camera device 110, etc.). One or more components of the surveillance system 100 may access the data or instructions stored in the storage device 140 via the network 130. In some embodiments, the storage device 140 may be directly connected to or communicate with one or more components of the surveillance system 100 (e.g., the server 120, the camera device 110, etc.). In some embodiments, the storage device 140 may be part of the server 120.

In some embodiments, the surveillance system 100 may further include one or more power supplies (not shown in FIG. 1) connected to one or more components of the surveillance system 100 (e.g., the camera device 110, the server 120, the storage device 140).

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 140 may be a data storage device including cloud computing platforms, such as, public cloud, private cloud, community, and hybrid clouds, etc. However, those variations and modifications do not depart the scope of the present disclosure. It should be noted that the structures of the camera body described above are non-limiting. For example, the camera body may be a dome camera body, a semi-dome camera body, a gun-shaped camera body, or the like, or any combination thereof. It should be noted that the camera device 110 described above may be used in other suitable application scenarios, e.g., information acquisition, inspection and testing, scientific research, target tracking, etc. For example, the camera device 110 may be mounted on a moving object (e.g., a vehicle, an airplane) to continuously track a target object.

Figure 2:
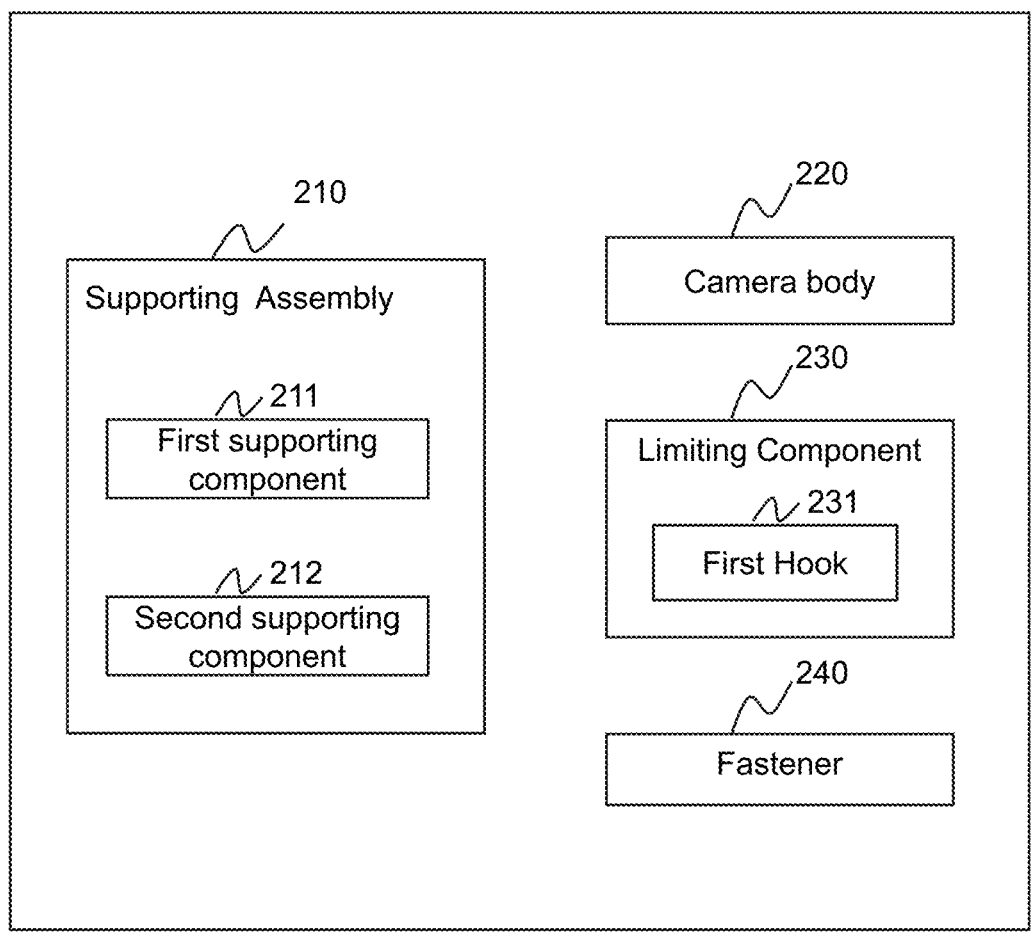
FIG. 2 is a block diagram illustrating an exemplary camera device according to some embodiments of the present disclosure.

FIG. 2 is a block diagram illustrating an exemplary camera device 110 according to some embodiments of the present disclosure. As illustrated, the camera device 110 may include a supporting assembly 210, a camera body 220, a limiting component 230, and at least one fastener 240.

The camera body 220 may accommodate a lens, a battery, wires, etc. The supporting assembly 210 may include a first supporting component 211 and a second supporting component 212. The first supporting component 211 may be connected to a fixed object (e.g., a wall, a frame). The second supporting component 212 may be rotatably connected to the first supporting component 211. The camera body 220 may be mechanically connected to the second supporting component 212 such that an orientation of the camera body 220 with respect to the first supporting component 211 is adjustable with a rotation of the second supporting component 212 relative to the first supporting component 211. Specifically, the first supporting component 211 and the second supporting component 212 may include at least one guide protrusion and at least one guide groove. The second supporting component 212 may rotate with respect to the first supporting component 211 through the at least one guide protrusion sliding along the at least one guide groove. An operator may implement wire connection inside the camera body 220 when the camera body 220 suspends on the second supporting component 212 by the limiting component 230. The operator may rotate the second supporting component 212 to change the position of the limiting component 230 such that the limiting component 230 may keep a distance away from an external object, e.g., the fixed object. More detailed descriptions of the supporting assembly 210, the first supporting component 211 and/or the second supporting component 212 may be found elsewhere in the present disclosure. See, e.g., FIGS. 15-18, and the descriptions thereof.

The limiting component 230 may include a groove. The supporting assembly 210 or the camera body 220 may include a protrusion. The camera body 220 may be secured by fitting the protrusion into the groove such that the camera body 220 may not shake during the wire connection. After completing the wire connection, the operator may uplift the camera body 220 to withdraw the protrusion from the groove, such that the camera body may be rotatably connected to the supporting assembly 210, thereby facilitating the assembly of the camera body 220 and the supporting assembly 210. For illustration purposes, the limiting component 230 may include a first hook 231. The first hook 231 may include the groove. More detailed descriptions of the limiting component 230 and/or the first hook 231 may be found elsewhere in the present disclosure. See, e.g., FIGS. 3-4, 6A, 7-10, 13-14, and the descriptions thereof. The camera body 220 and the supporting assembly 210 may be further fixed together by the limiting component 230 and the fastener(s) 240. For example, the fastener(s) 240 may include a second hook, a clasp assembly, a screw, a nut, a bolt, a gasket, an airtight glue, an airtight adhesive tape, or the like, or any combination thereof.

Figure 3:
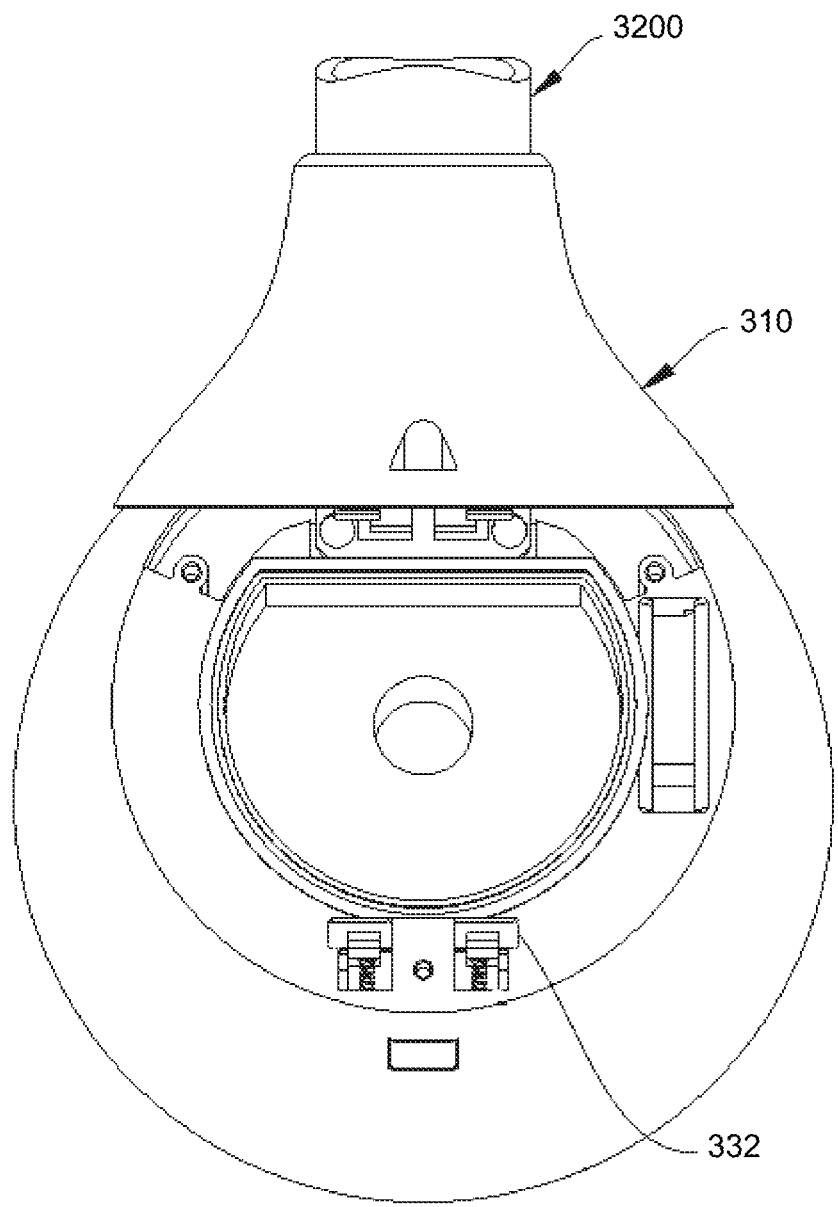
FIGS. 3-4 illustrate different views of an exemplary camera device according to some embodiments of the present disclosure.
Figure 4:
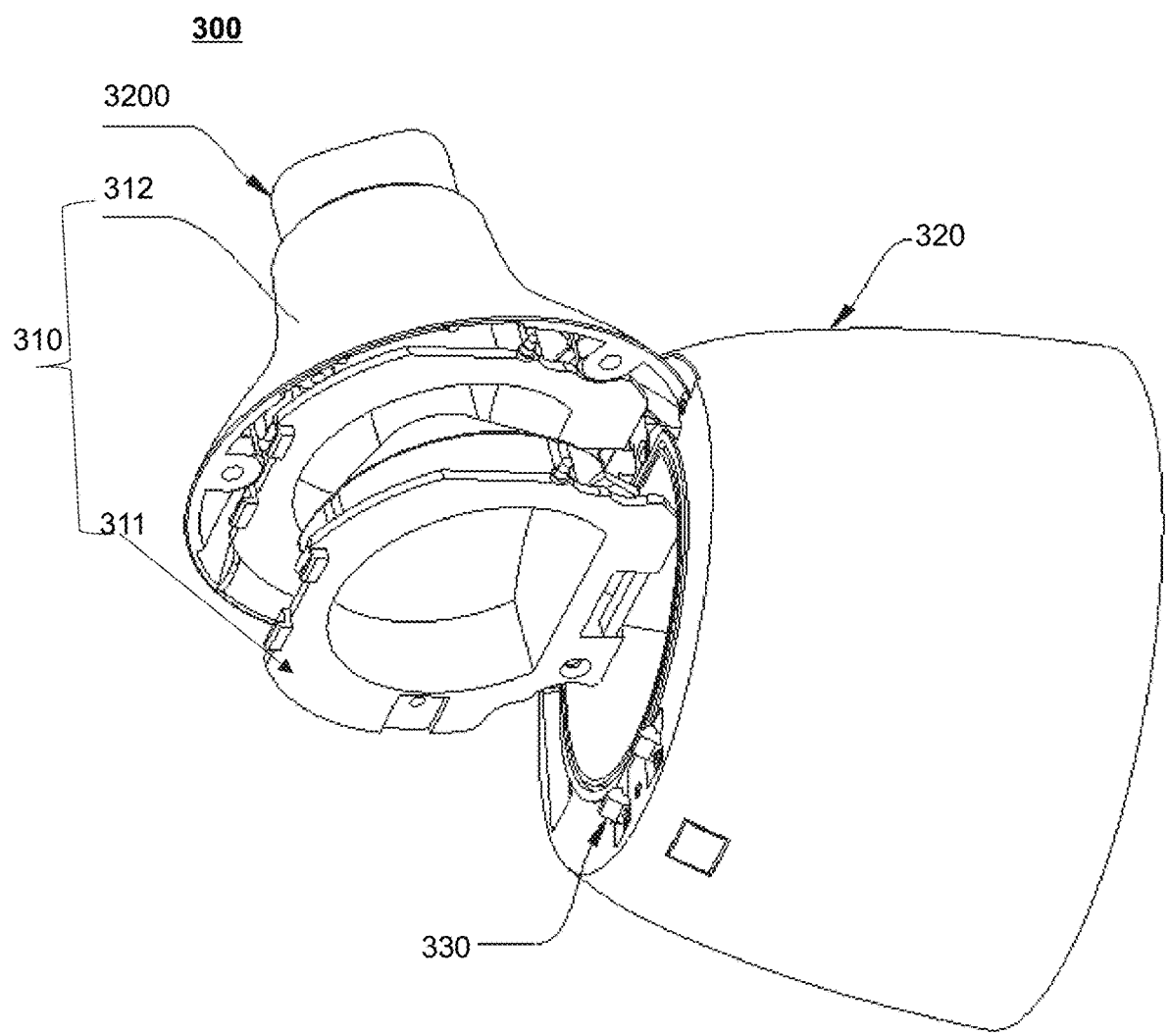
Figure 5:
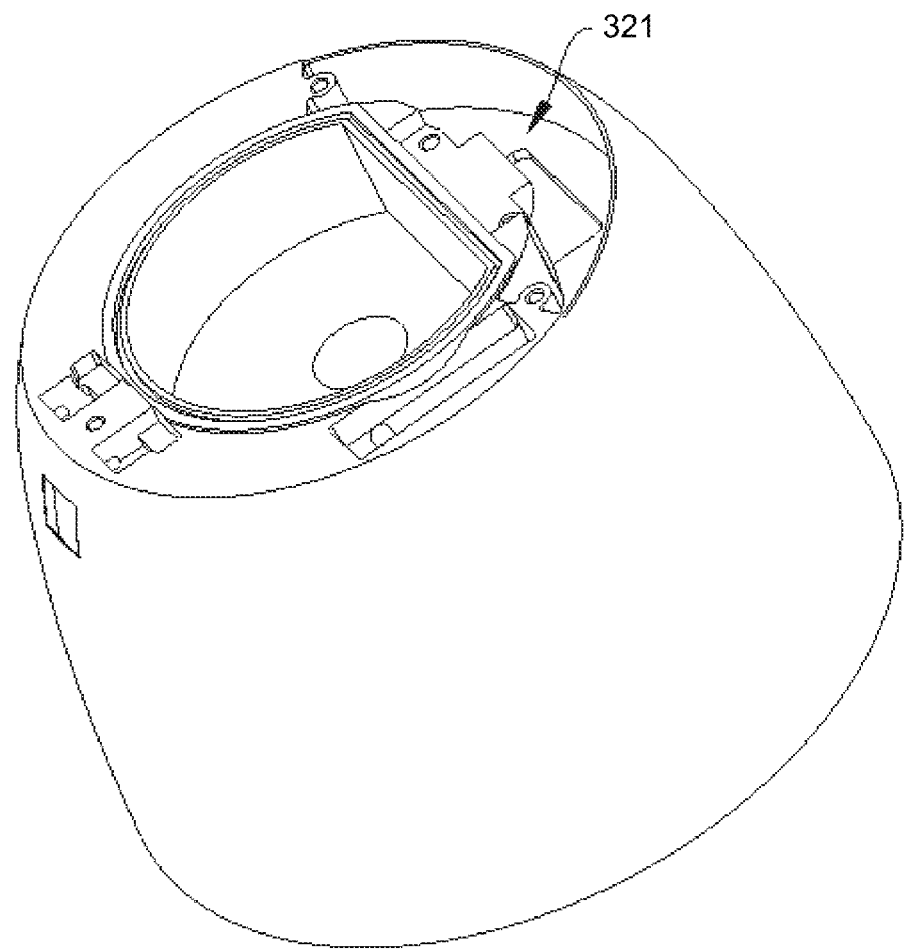
FIG. 5 illustrates an exemplary camera body according to some embodiments of the present disclosure.
Figure 6A:
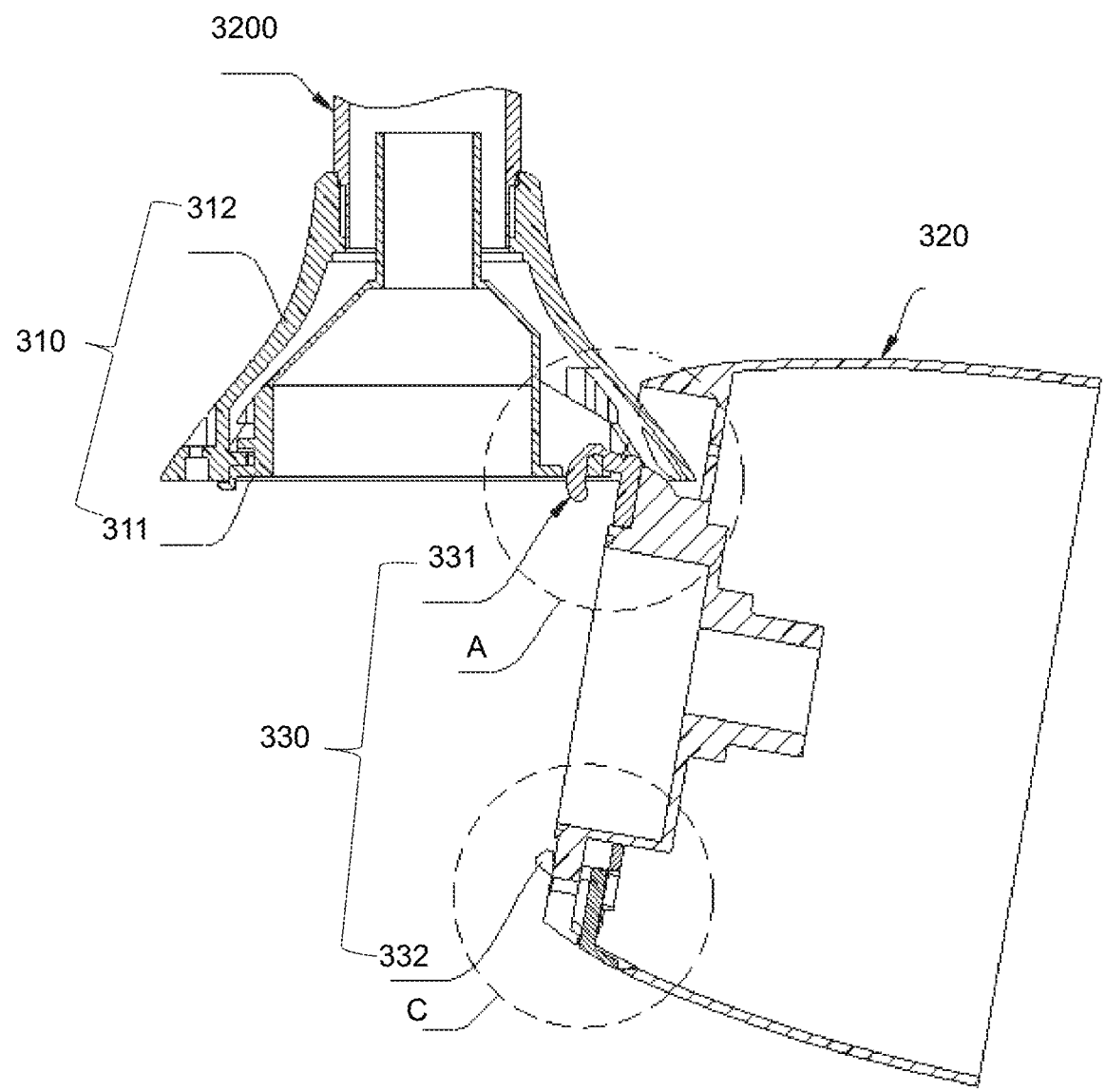
FIG. 6A illustrates a section view of the camera device in FIGS. 3-4 according to some embodiments of the present disclosure.

FIGS. 3-4 illustrate different views of an exemplary camera device 300 according to some embodiments of the present disclosure. FIG. 5 illustrates a camera body 320 of the camera device 300 according to some embodiments of the present disclosure. FIG. 6A illustrates a section view of the camera device 300 according to some embodiments of the present disclosure.

The camera device 300 may include a camera body 320 and a first supporting component 311. The first supporting component 311 may be mechanically coupled to a fixed object, e.g., a frame 3200. In some embodiments, the fixed object may be external to the camera device 300. For example, the fixed object may include a wall (e.g., a ceiling) external to the camera device 300. In some embodiments, the first supporting component 311 may be coupled to the fixed object by welding, screwing, embedding, a mechanical element, etc. For example, the mechanical element may include a converter, an adaptor ring, a bolt, a screw, a nut, a gasket, an airtight glue, an airtight adhesive tape, or the like, or any combination thereof. In some embodiments, the first supporting component 311 may include a flange, a frame, or the like, or any combination thereof. For illustration purposes, the first supporting component 311 may include a flange. The flange may be a component that can be mechanically connected with other components (e.g., the frame 3200, the camera body 320) of the camera device 300. Besides, the flange may be relatively cheap, and the cost of the camera device 300 may be reduced.

The camera body 320 may accommodate one or more components to implement functions, e.g., capturing images and/or videos of a target scene, processing the images and/or videos, transmitting the (processed) images and/or videos to other components (e.g., the processing device 122) of the surveillance system 100, etc. For example, the one or more components to implement the functions may include a lens, a battery, wires, etc. The lens may be used to capture the images and/or videos. The battery may provide power to the camera device 300 (e.g., the camera body 320). The wires may electrically connect different components of the camera body 320 to implement the functions. For example, the battery may provide the power to other components of the camera device 300 via the wires. Additionally or alternatively, the camera body 320 may be communicatively coupled to other components (e.g., the processing device 122) of the surveillance system 100 via the wires, such that the camera body 320 may transmit the images and/or videos to the processing device 122.

In practice, the wires need to be manually connected while assembling the camera device 300. To manually connect the wires, enough space shall be provided between the camera body 320 and the first supporting component 311 such that the hand of an operator may reach inside the camera body 320 and perform the wire connection. As shown in FIGS. 3 and 4, one end of the camera body 320 may suspend on the first supporting component 311, and the opposite end of the camera body 320 may hang in the air. Therefore, the camera body 320 may tilt relative to the first supporting component 311, leaving a space above its upper surface for the hand of the operator to stretch into the camera body 320 to implement the wire connection. In some cases, the camera device 300 may be fixed at a relatively high position to capture the images and/or videos of the target scene from a wide view. Thus, the operator may stand at a relatively high position to implement the wire connection. In some cases, the camera body 320 may shake at the tilted state, which may increase the difficulty for and reduce the accuracy for the wire connection especially when the operator needs to insert a plug into or pull out the plug from a plate of the camera body 320 at the relatively high position. To reduce the shaking of the camera body 320 and facilitate the assembly of the camera device 300, in some embodiments, the camera device 300 may include a limiting component. The limiting component may secure the camera body 320 at a position relative to the first supporting component 311 (e.g., the position as shown in FIG. 4) that provides enough space above the camera body 320. Thus, the camera body 320 may maintain stable at the position when the operator implements the wire connection.

In some embodiments, the limiting component may include a first hook. The first hook may include a groove. The camera body 320 or the first supporting component 311 may include a protrusion. The camera body 320 may be secured at the position relative to the first supporting component 311 by fitting the protrusion into the groove. After completing the wire connection, the operator may uplift the camera body 320 to withdraw the protrusion from the groove, such that the first hook may be rotatably connected to the first supporting component 311 or the camera body 320, thereby facilitating the assembly of the camera body 320 and the first supporting component 311. In some embodiments, the shape of the groove and the shape of the protrusion may be mutually matched. The protrusion may have a shape of a bean, a shape of a rounded rectangle, an elliptical shape, a trapezoidal shape, or the like, or any combination thereof. Specifically, the protrusion may have an elliptical shape. The stability of the contact area between an elliptical protrusion and an elliptical groove may be relatively good. Besides, the cost for manufacturing the elliptical protrusion and an elliptical groove may be relatively low. More detailed descriptions of the limiting component, the groove, and/or the protrusion may be found elsewhere in the present disclosure. See, e.g., FIGS. 6A, 7-9, 11-14, and the descriptions thereof.

In some embodiments, the limiting component (e.g., the first hook) may prevent the camera body 320 from shaking during the wire connection. Besides, when the camera body 320 is uplifted, the coupling between the limiting component and the protrusion may be released, and the limiting component and the camera body 320 may be rotatable with respect to the first supporting component 311. In such case, the operator can easily secure the camera body 320 at a specific position to implement the wire connection, and then release the camera body 320 from the specific position to further assemble the camera body 320 with the first supporting component 311.

After the camera body 320 rotates to a position that coincides with the first supporting component 311, the camera body 320 and the first supporting component 311 may be fixed together through at least one fastener. In some embodiments, the fastener(s) may include a second hook, a clasp assembly, a screw, a nut, or the like, or any combination thereof. In some embodiments, a first side of the second hook may be connected to one of the camera body 320 and the first supporting component 311. A second side of the second hook 332 may be rotatably and detachably connected to another of the camera body 320 and the first supporting component 311. More detailed descriptions of the second hook 332 may be found elsewhere in the present disclosure. See, e.g., FIG. 10 and the descriptions thereof.

Figure 6B:
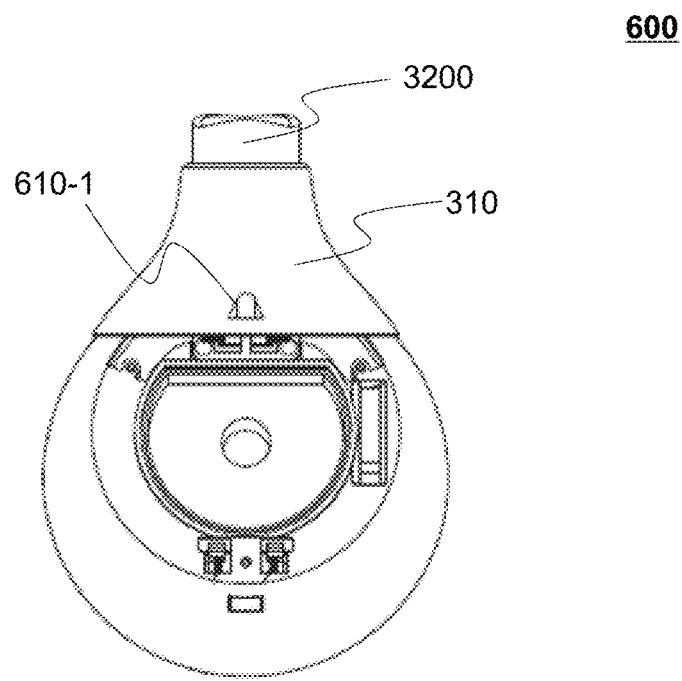
FIG. 6B illustrates an exemplary camera device according to some embodiments of the present disclosure.
Figure 6C:
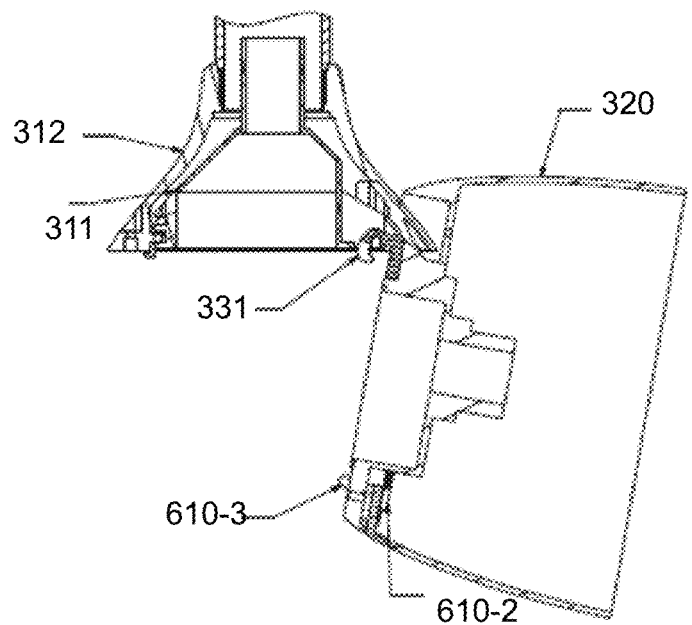
FIG. 6C illustrates a section view of the exemplary camera device in FIG. 6B according to some embodiments of the present disclosure.

FIG. 6B illustrates an exemplary camera device 600 according to some embodiments of the present disclosure. FIG. 6C illustrates a section view of the camera device 600 according to some embodiments of the present disclosure. The camera device 600 may include a clasp assembly. The clasp assembly may include a clasp 610-1, an elastic component 610-2, and a clasp fastening component 610-3. The elastic component 610-2 and the clasp fastening component 610-3 may be located at the camera body 320. The clasp 610-1 may be located at the first supporting component 311. The clasp 610-1 may be fixed on the first supporting component 311 through the elastic component 610-2 and the clasp fastening component 610-3. In some alternative embodiments, the elastic component 610-2 and the clasp fastening component 610-3 may be located at the first supporting component 311. The clasp 610-1 may be located at the camera body 320. For example, the elastic component 610-2 may include a spring. In some embodiments, the clasp 610-1 may also include a press key configured to secure or release the camera body 320. For illustration purposes, the camera body 320 may be detached from the first supporting component 311 by pressing the pressing key.

In some embodiments, as shown in FIGS. 3-4, the camera device 300 may also include a second supporting component 312. The second supporting component 312 may also be connected to the fixed object (e.g., the frame 3200). The second supporting component 312 may be located at an upper side of the first supporting component 311 and sleeved on the first supporting component 311. The second supporting component 312 may restrict the position of the camera body 320 and prevent the first hook 331 from being far away from the protrusion when the protrusion is withdrawn from the groove, such that the camera body 320 may not be completely separated from the first supporting component 331 when it is uplifted. As shown in FIG. 5, the camera body 320 may include a chamber 321 to accommodate a portion of the second supporting component 312, avoiding the portion of the second supporting component 312 colliding with other components of the camera body 320. As shown in FIG. 6A, the first supporting component 311 may be positioned inside the second supporting component 311 and a portion of the second supporting component 312 may be accommodated inside the chamber 321 of the camera body 320 when the camera body 320 suspends on the first supporting component 311 via the first hook 331. The first hook 311 may be located between the first supporting component 311 and the second component 312. Thus, the first hook 331 may be inside the camera device 300 after fastening the camera body 320.

It should be noted that the second supporting component 312 can be replaced by other components as long as the components may restrict the position of the first hook when the protrusion is withdrawn from the groove. For example, the first supporting component 311 may include a plate located above the first hook. The plate may similarly prevent the first hook 331 from being far away from the protrusion when the protrusion is withdrawn from the groove. It should also be noted that the first supporting component 311 and/or the second supporting component 312 may be any suitable components that can connect the camera body 320 to the frame 3200. For illustration purposes, the first supporting component 311 and/or the second supporting component 312 may include a flange, a frame, or the like, or any combination thereof. Specifically, the first supporting component 311 and/or the second supporting component 312 may include flanges. The flanges may be components that can be mechanically connected with other components (e.g., the frame 3200, the camera body 320) of the camera device 300. Besides, the flanges may be relatively cheap and the cost of the camera device 300 may be reduced. It should also be noted that the first supporting component 311 and/or the second supporting component 312 may be used interchangeably. For example, the first supporting component 311 may be located at an upper side of the second supporting component 312 and sleeved on the second supporting component 312. The second supporting component 312 may be connected to the camera body 320.

In some embodiments, the first supporting component 311 may be connected to the fixed object. The limiting component may secure the camera body 320 at the position relative to the supporting component 11 by fitting the protrusion into the groove. The camera body 320 may be at the tilted state at the position. An operator may then implement the wire connection. The operator may withdraw the protrusion from the groove by uplifting the camera body 320, and the first supporting component 311 may fix the camera body 320 at a target position relative to the first supporting component 311 where the upper surface of the camera body 320 coincides with the first supporting component 311. After the first supporting component 311 and the camera body 320 are fully assembled (e.g., both ends of the camera body 320 are mounted on the first supporting component 311 through the limiting component and the fasteners), the lens may work under a normal condition. For example, the camera body 320 (e.g., the lens) may capture and/or obtain images and/or videos of a target scene at the target position.

In some embodiments, as shown in FIG. 6A, the camera device 300 may include the camera body 320, the first supporting component 311, the second supporting component 312, the first hook 331, and the second hook 332. For brevity, the first supporting component 311, the second supporting component 312 may be collectively referred to as a supporting assembly 310. The first hook 331 and the second hook 332 may be collectively referred to as a hook assembly 330. The hook assembly 330 may be arranged between the supporting assembly 310 and the camera body 320. The supporting assembly 310 may be mechanically coupled to the hook assembly 330 and fixed on the frame 3200. In some embodiments, the camera body 320 may be detachably coupled to the supporting assembly 310 through the hook assembly 330, thereby easily assembling and disassembling the camera body 320 and the supporting assembly 310.

In some embodiments, the first hook 331 and the second hook 332 may include a bent part and a connecting part connected to the bent part, respectively. The connecting part of the first hook 331 and the connecting part of the second hook 332 may be fixed on the camera body 320. The bent part of the first hook 331 and the bent part of the second hook 332 may be detachably connected to the first supporting component 311. When the camera body 320 is at the tilted state, the camera body 320 may suspend on the supporting assembly 310 (e.g., the first supporting component 311) by the first hook 331. The second hook 332 may be separated from the supporting assembly 310. Thus, the inside of the camera body 320 may be exposed outside and the operator may implement the wire connection. After completing the wire connection, the camera body 320 and the supporting assembly 310 may be further assembled. The second hook 332 may be connected to the supporting assembly 310. The camera body 320 may be fastened on the supporting assembly 310 via the first hook 331 and the second hook 332. Thus, the camera body 320 may be fixed on the supporting assembly 310 by a multi-point connection. Since the bent part of the second hook 332 is detachably connected to the supporting assembly 310, the second hook 332 may be detached from the supporting assembly 310 to, e.g., implement the wire connection.

In some embodiments, the connecting part of the first hook 331 and the connecting part of the second hook 332 may be located at two positions of the camera body 320. The two positions may be relatively close to a side (e.g., the circumferential side facing the camera body 320) of the first supporting component 311 and far from each other, which ensures to stably fix the camera body 320 on the first supporting component 311. In some alternative embodiments, the connecting part of the first hook 331 and the connecting part of the second hook 332 may be fixed on the first supporting component 311. The bent part of the first hook 331 and the bent part of the second hook 332 may be detachably connected to the camera body 320.

It should be noted that the bent parts and the connecting parts of the first hook 331 and the second hook 332 may be connected to the same component or different components (e.g., the first supporting component 311, the camera body 320) of the camera device 300, respectively. For example, if the bent part of the first hook 331 is connected to the first supporting component 311, the bent part of the second hook 332 may also be connected to the first supporting component 311. As another example, if the connecting part of the first hook 331 is connected to the first supporting component 311, the connecting part of the second hook 332 may also be connected to the first supporting component 311. As a further example, if the bent part of the first hook 331 is connected to the first supporting component 311, the bent part of the second hook 332 may be connected to the camera body 320. As a further example, if the bent part of the first hook 331 is connected to the camera body 320, the bent part of the second hook 332 may be connected to the first supporting component 311.

In some embodiments, considering that the supporting assembly 310 may be fixed on the fixed object and the camera body 320 may be rotatable with respect to the supporting assembly 310, the connecting parts of the hook assembly 330 may be fixedly connected to the camera body 320, and the bent parts of the hook assembly 330 may be rotatably connected to the supporting assembly 310. By doing so, the camera body 320 and the bent parts of the hook assembly 330 may stably rotate relative to the first supporting component 311 when the camera body 320 is lifted. In some alternative embodiments, without considering the stability of the rotation, the connecting part may be fixedly connected to the first supporting component 311, and the bent part may be rotatably connected to the camera body 320.

It should be noted that the number (or count) of hooks between the camera body 320 and the supporting assembly 310 is non-limiting, e.g., 3 or more. In some embodiments, the more the number (or count) of hooks between the camera body 320 and the supporting assembly 310 is, the more stable the connection between the camera body 320 and the supporting assembly 310 may be. In some embodiments, the camera device 300 may only include the first hook 331 and the second hook 332.

Figure 7:
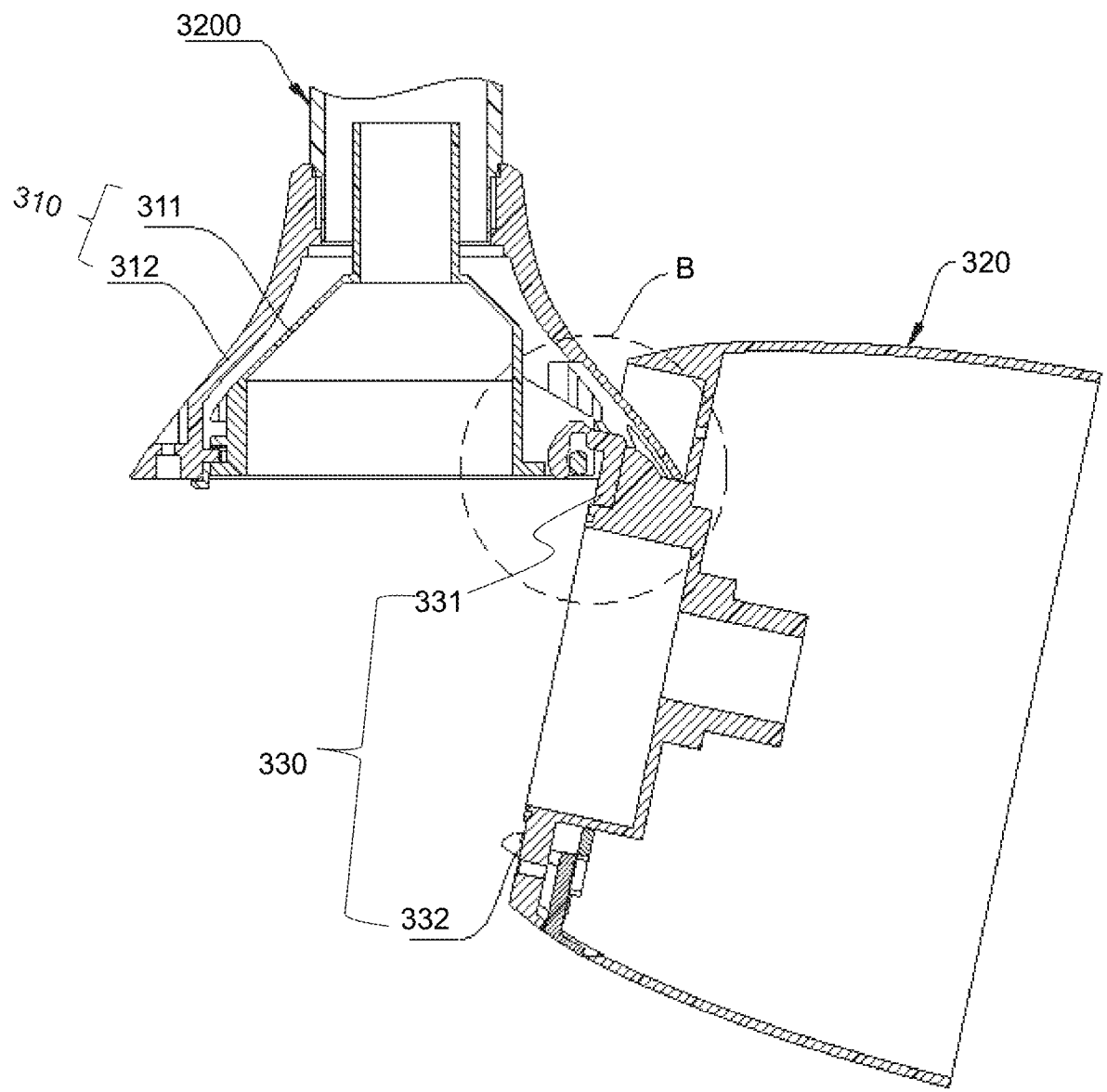
FIG. 7 illustrates a section view of the camera device in FIGS. 3-4 according to some embodiments of the present disclosure.
Figure 8:
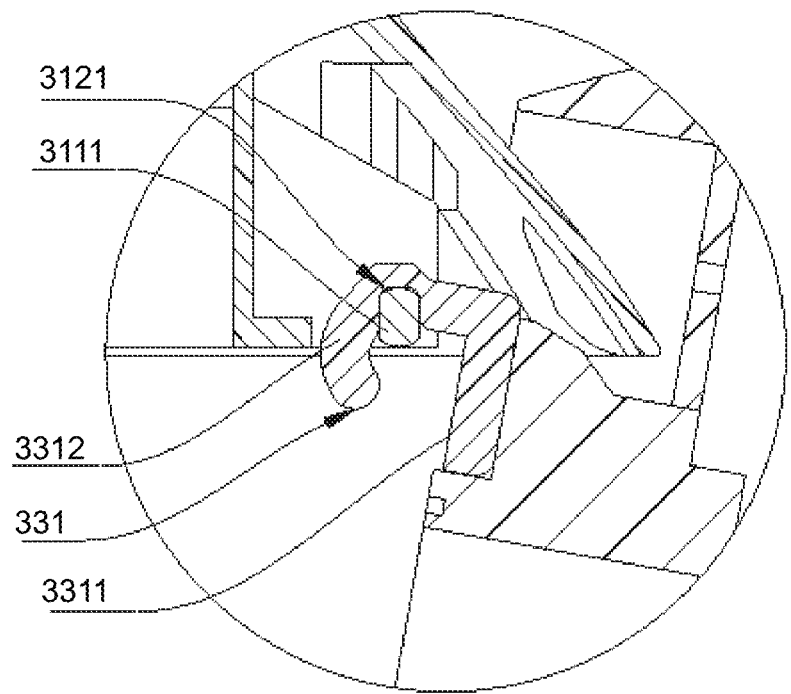
FIG. 8 illustrates an enlarged view of part A in FIG. 6A according to some embodiments of the present disclosure.
Figure 9:
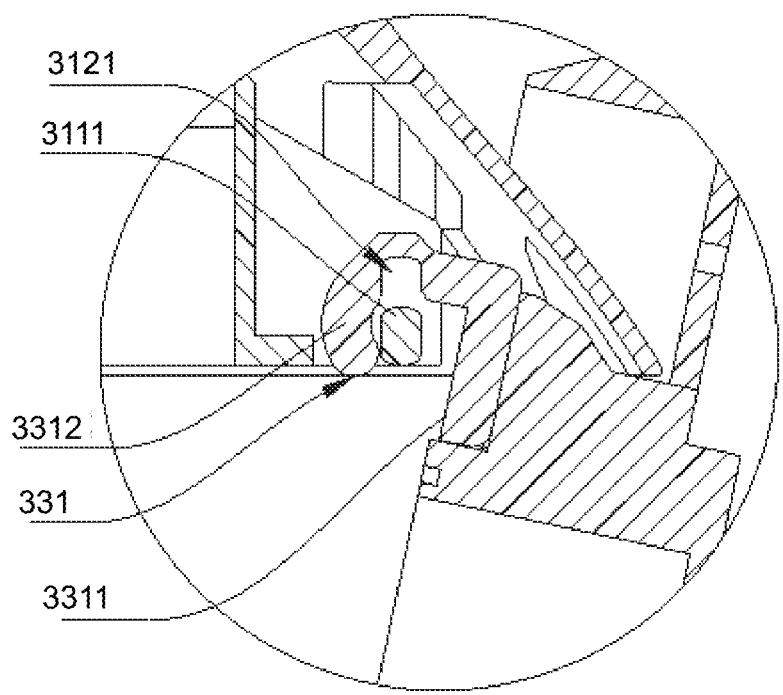
FIG. 9 illustrates an enlarged view of part B in FIG. 7 according to some embodiments of the present disclosure.

FIG. 7 illustrates a section view of the camera device 300 according to some embodiments of the present disclosure. FIG. 8 illustrates an enlarged view of part A in FIG. 6A according to some embodiments of the present disclosure. FIG. 9 illustrates an enlarged view of part B in FIG. 7 according to some embodiments of the present disclosure.

As shown in FIGS. 8-9, the first hook 331 may include a bent part 3312 and a connecting part 3311 connected to the bent part 3312. The connecting part 3311 may be mounted on the camera body 320. The bent part 3312 may be configured to be connected to the first supporting component 311. The first hook 331 may include a groove 3121. The groove 3121 may be formed by the bent part 3312. The first supporting component 311 may include a protrusion 3111. For brevity, the bent part 3312 may refer to the part of the first hook 331 that is configured to touch the protrusion 3111. The connecting part 3311 may refer to the remaining part of the first hook 331 other than the bent part 3312, e.g., the part that is mounted on the camera body 320.

As shown in FIG. 8, the protrusion 3111 may be fitted into the groove 3121, and the bent part 3312 may be fixedly connected to the first supporting component 311 when the camera body 320 suspends on the first supporting component 311. Accordingly, the camera body 320 may be stable when the operator implements the wire connection, thereby reducing the difficulty for the wire connection, and increasing the convenience and efficiency of the wire connection. As shown in FIGS. 7 and 9, the groove 3121 may be withdrawn from the protrusion 3111 of the first supporting component 311 when the camera body 320 is uplifted. In such case, the camera body 320 may be rotatable around the first supporting component 311.

Figure 10:
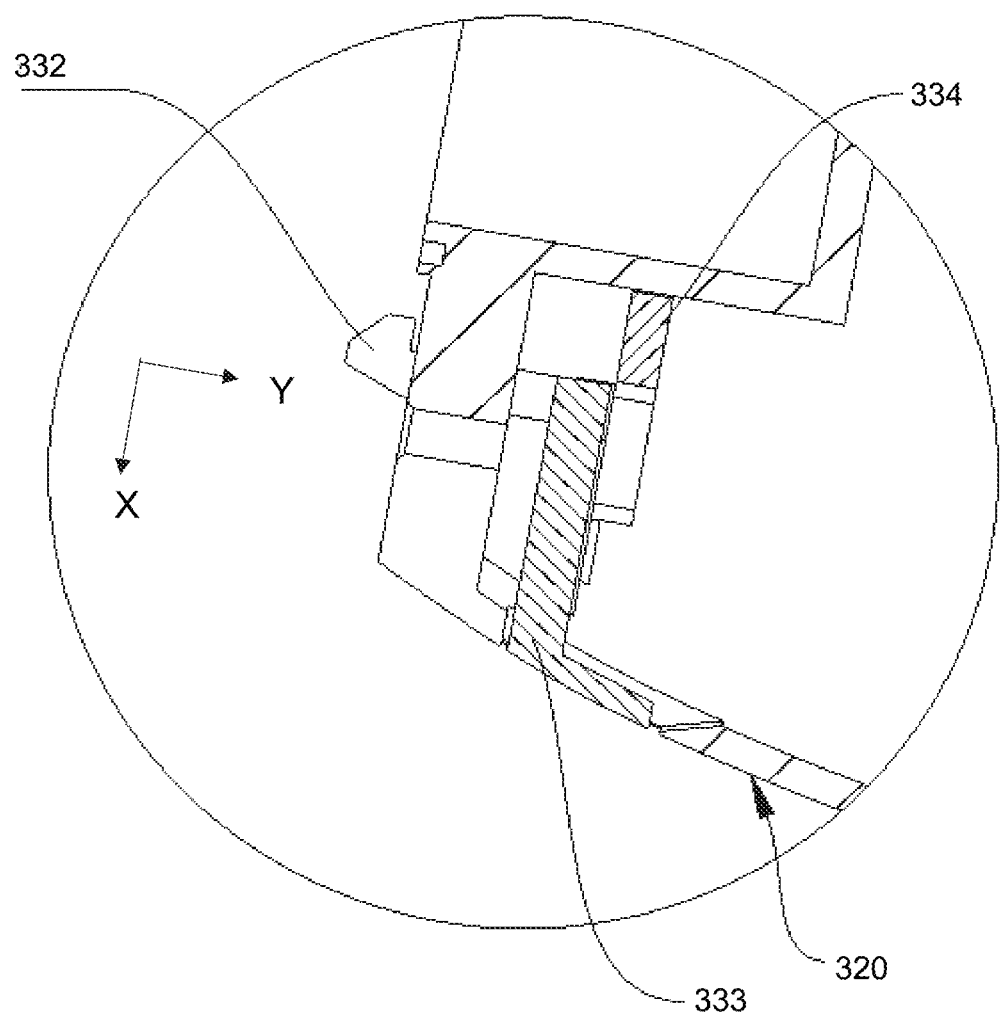
FIG. 10 illustrates an enlarged view of part C in FIG. 6A according to some embodiments of the present disclosure.

FIG. 10 illustrates an enlarged view of part C in FIG. 6A according to some embodiments of the present disclosure.

As shown in FIG. 10, the second hook 332 may include an elastic component 333. The elastic component 333 may be located between the connecting part of the second hook 332 and the camera body 320. The elastic component 333 may facilitate the connecting part of the second hook 332 to detachably connect to the first supporting component 311. When the second hook 332 needs to be connected to the first supporting component 311, the first supporting component 311 may apply a force on the second hook 332. The elastic component 333 may be compressed by the second hook 332 to allow the second hook 332 to move along the positive X-axis direction, and the second hook 332 may be smoothly connected to the first supporting component 311 when the bent part of the second hook 332 is hooked on a part (e.g., a shaft) of the first supporting component 311.

The second hook 332 may also include a plate 334. The plate 334 may be located between the connecting part of the second hook 332 and the camera body 320. A first side of the elastic component 333 may be located at the camera body 320. A second side of the elastic component 333 may be connected to the plate 334. The elastic component 333 may be stretchable along the X-axis direction, which allows the second hook 332 to move back and forward along the X-axis direction, such that the second hook 332 may be connected to disconnected to the first supporting component 311. By arranging the plate 334, the compressed or released elastic component 333 may not directly touch or collide with the camera body 320, thereby reducing friction between the second hook 332 and the camera body 320 and protecting the camera body 320.

Figure 11:
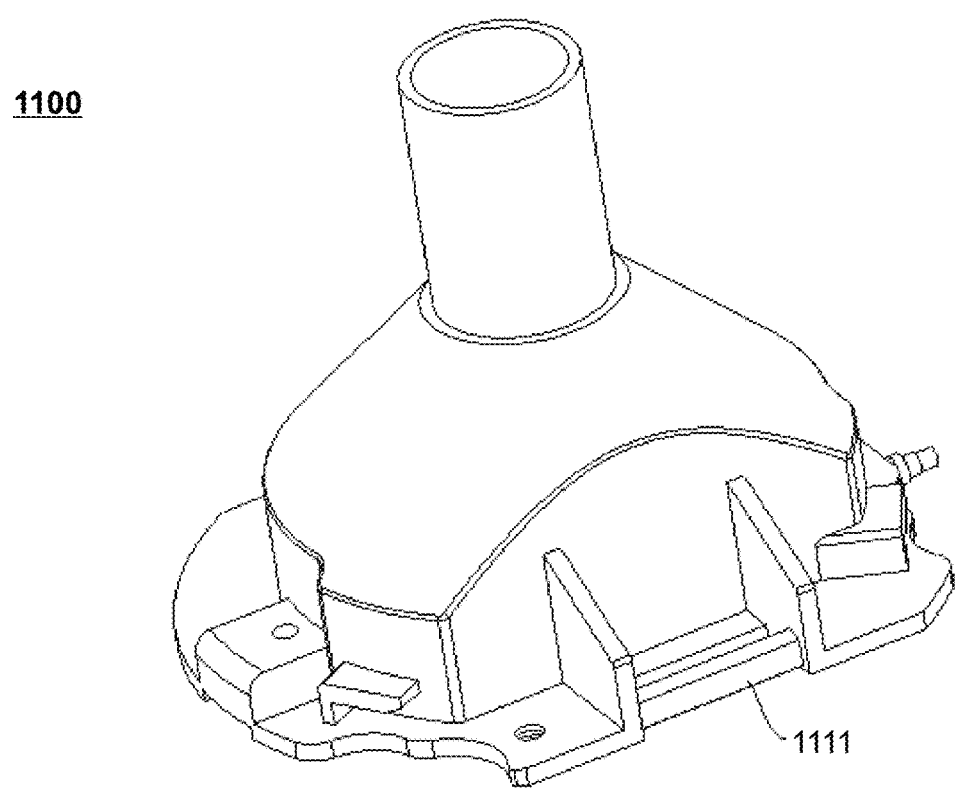
FIG. 11 illustrates a first exemplary supporting component according to some embodiments of the present disclosure.
Figure 12:
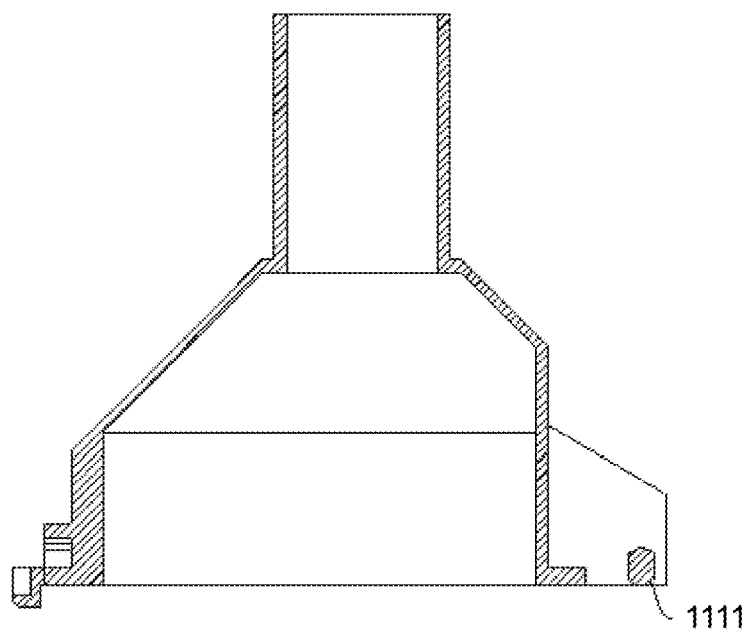
FIG. 12 illustrates a section view of the first exemplary supporting component in FIG. 11 according to some embodiments of the present disclosure.
Figure 13:
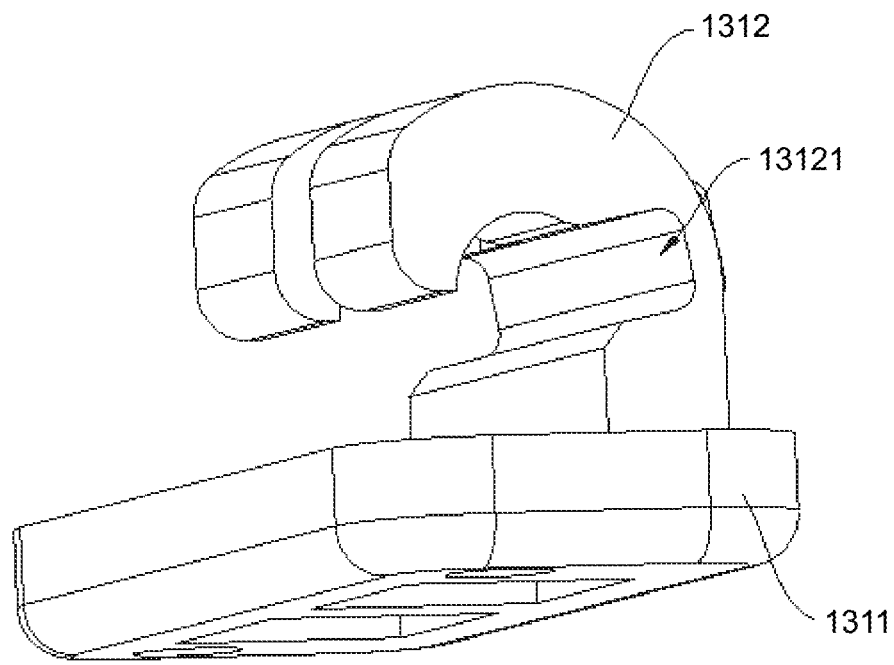
FIG. 13 illustrates a first exemplary hook according to some embodiments of the present disclosure.
Figure 14:
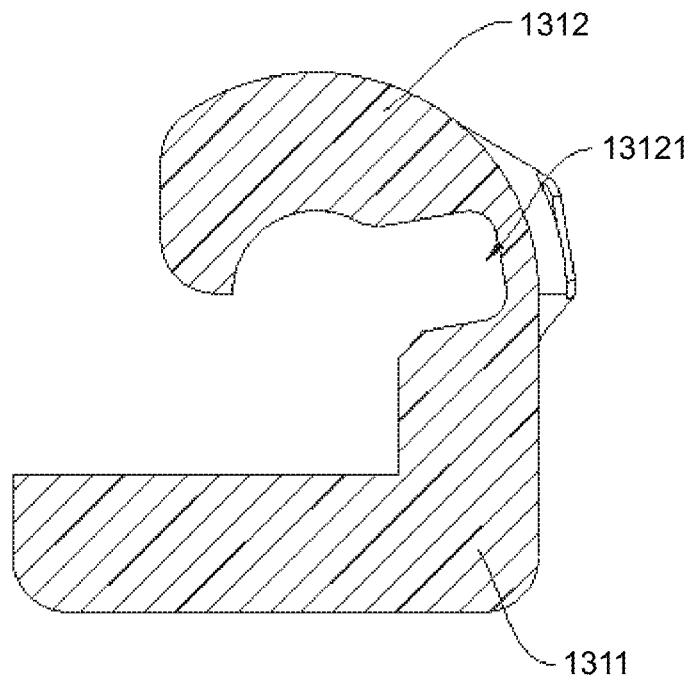
FIG. 14 illustrates a section view of the first exemplary hook in FIG. 13 according to some embodiments of the present disclosure.

FIG. 11 illustrates a first exemplary supporting component 1100 according to some embodiments of the present disclosure. FIG. 12 illustrates a section view of the first supporting component 1100 according to some embodiments of the present disclosure. FIG. 13 illustrates a first hook 1300 according to some embodiments of the present disclosure. FIG. 14 illustrates a section view of the first hook 1300 according to some embodiments of the present disclosure. The first supporting component 1100 may be an example of the first supporting component 311 as illustrated in FIGS. 3-4 and 6A-9. The first hook 1300 may be an example of the first hook 331 as illustrated in FIGS. 3-4 and 6A-9.

As shown in FIGS. 13-14, the first hook 1300 may include a connecting part 1311 and a bent part 1312. The connecting part 1311 may be connected to the bent part 1312. The connecting part 1311 may be connected to a camera body (e.g., the camera body 320 as illustrated in FIGS. 3-9). The bent part 1312 may be connected to the first supporting component 1100. Alternatively, the connecting part 1311 may be connected to the supporting component and the bent part 1312 may be connected to the camera body. The bent part 1312 may include a groove 13121. The groove 13121 may be located at an inner side of the bent part 1312. As shown in FIGS. 11-12, the protrusion 1111 may extend outwardly from the outer wall of the first supporting component 1100. The rotation of the first hook 1300 may be limited by fitting the protrusion 1111 into the groove 13121.

Figure 15:
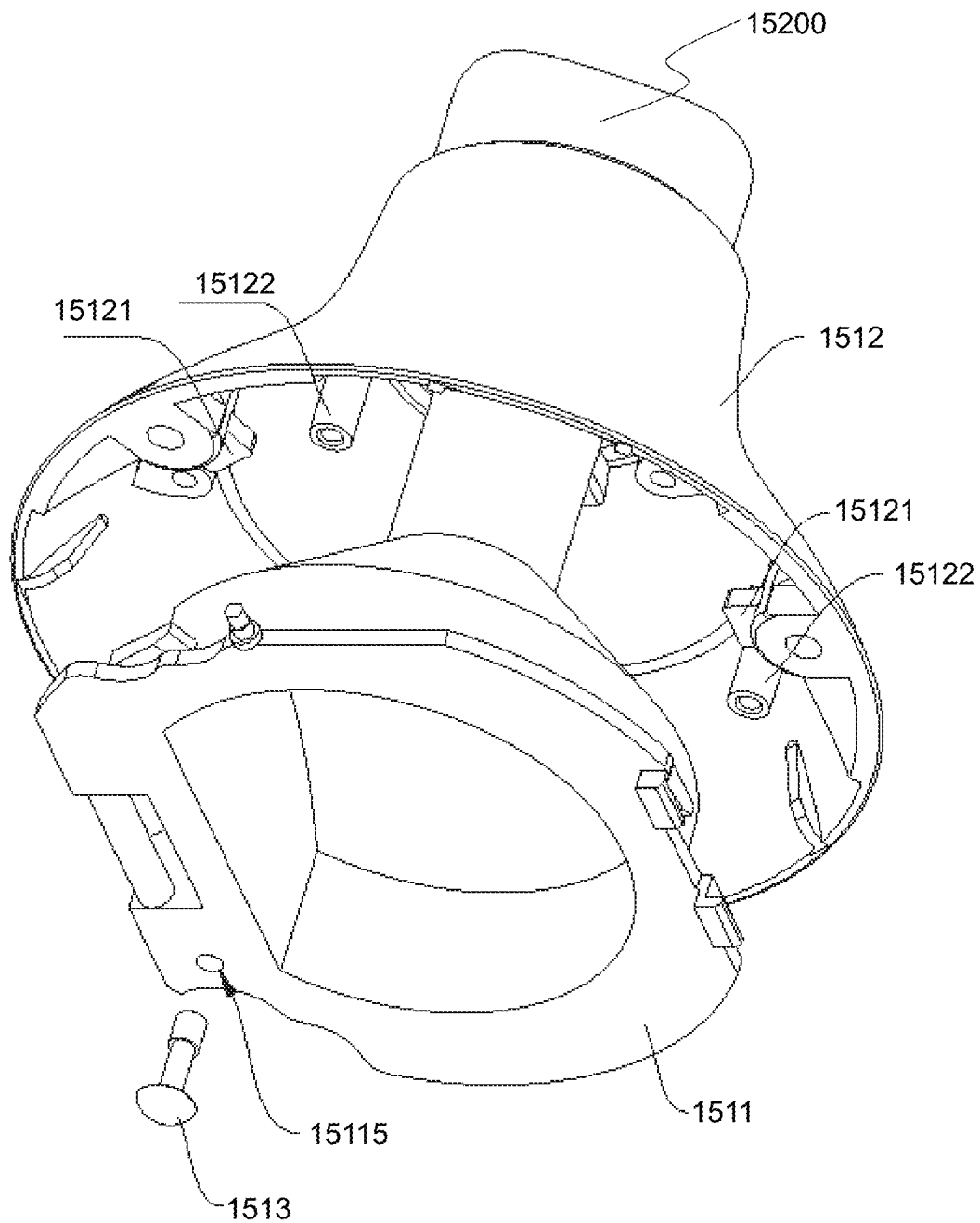
FIG. 15 illustrates an exemplary supporting assembly according to some embodiments of the present disclosure.
Figure 16:
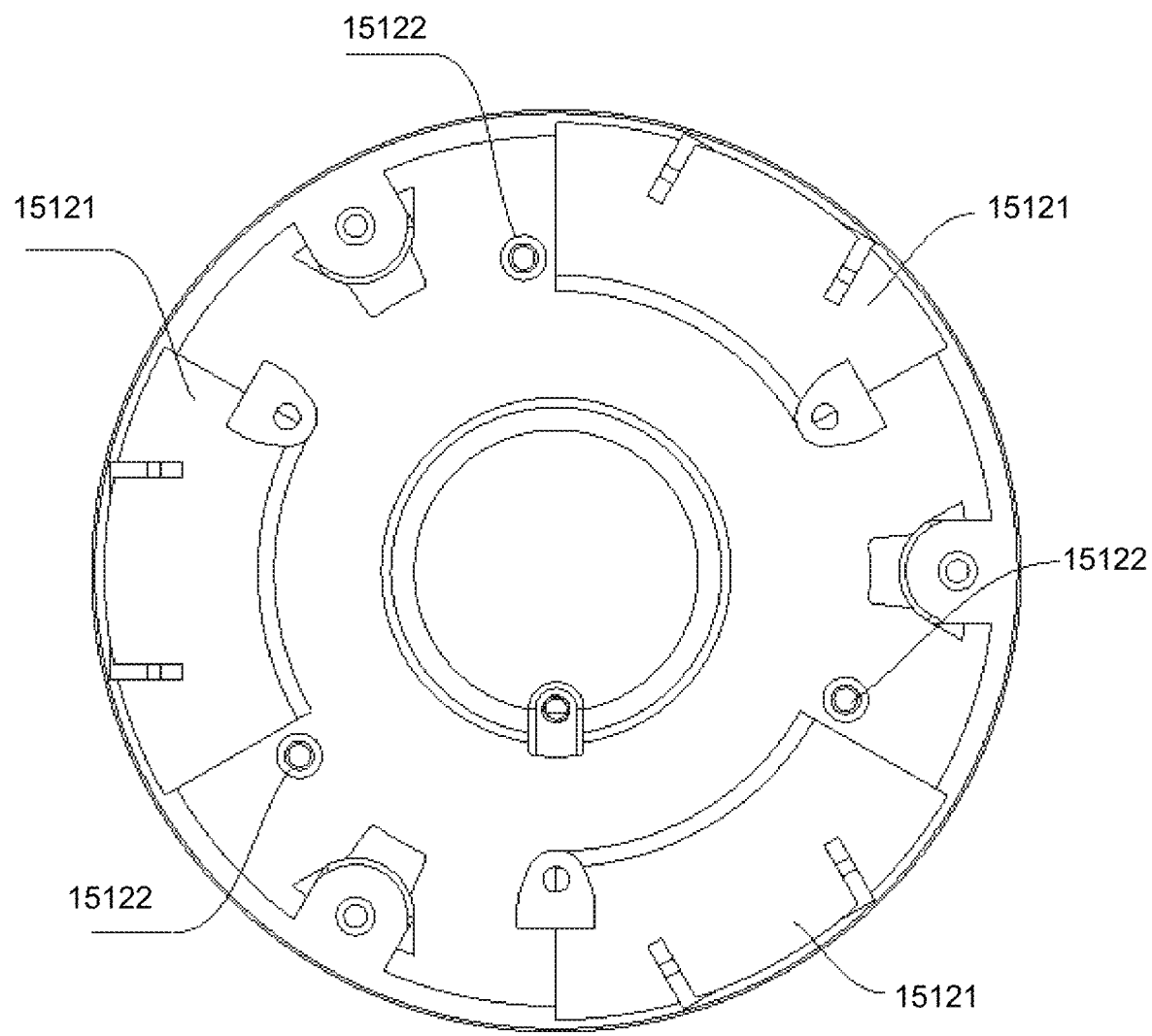
FIG. 16 illustrates a section view of a first exemplary supporting component of the exemplary supporting assembly in FIG. 15 according to some embodiments of the present disclosure.

FIG. 15 illustrates an exemplary supporting assembly 1500 according to some embodiments of the present disclosure. The supporting assembly 1500 may include a first supporting component 1512 and a second supporting component 1511. FIG. 16 illustrates a section view of the first supporting component 1512 according to some embodiments of the present disclosure.

As shown in FIGS. 3-4 and 6A-9, the camera body 320 may be at the tilted state when suspending on the first supporting component 311 via the first hook 331. If the position of the first hook 331 is near to an external object, e.g., the fixed object, a wall, etc., the camera body 320 at the tilted state may collide with the external object and/or be unable to open to a degree to implement the wire connection. In order to solve this problem, the position of the first hook 331 may need to be adjusted to keep a distance away from the external object. In some cases, the position of the first hook 331 may be adjusted by adjusting the orientation of the camera body 320 and/or the first supporting component 311. Since the camera body 320 is connected to the first supporting component 311, and the first supporting component 311 is fixed on the fixed object, the operator may need to disassemble the first supporting component 311 to adjust the orientation of the first supporting component 311 and further adjust the orientation of the camera body 320. In some cases, the first supporting component 311 may be a load-bearing component to support the camera body 320. The camera body 320 may be relatively heavy and the first supporting component 311 should be tightly connected to the fixed object. For illustration purposes, a large pre-tightening force may be applied to the first supporting component 311 to guarantee that the first supporting component 311 is tightly connected to the fixed object. Thus, the disassembly of the first supporting component 311 from the fixed object may be cumbersome, resulting in relatively low efficiency for assembling the camera device 300.

Some embodiments of the present disclosure may provide the supporting assembly 1500 to replace the first supporting component 311 or the supporting assembly 310. The supporting assembly 1500 may include a first supporting component 1512 and a second supporting component 1511. The first supporting component 1512 may be fixedly connected to the fixed object (e.g., a frame 15200 as shown in FIG. 15. The second supporting component 1511 may be rotatably connected to the first supporting component 1512. Specifically, the supporting assembly 1500 may include a plurality of guide protrusions 15121 and a plurality of guide grooves (not shown in FIGS. 15-16). The guide protrusions 15121 and the guide grooves may be mutually matched, i.e., the guide protrusions 15121 may be fitted into the guide grooves. The second supporting component 1511 may rotate with respect to the first supporting component 1512 through the guide protrusions 15121 sliding along the plurality of guide grooves. An orientation of the camera body 320 with respect to the first supporting component 1512 may be adjustable with a rotation of the second supporting component 1511 relative to the first supporting component 1512. If the position of the first hook 331 is near to the external object such that the camera body 320 at the tilted state collides with the external object and/or is unable to open to a degree to implement the wire connection, the operator may rotate the camera body 320 to an orientation where the first hook 311 is kept at a distance from the external object and the tilted camera body 320 is kept away from the external object. By doing so, the operator may manually adjust the orientation of the tilted camera body 320, thereby preventing the tilted camera body 320 from colliding with the external object, and opening the camera body 320 to a degree to implement the wire connection. Thus, the assembly of the camera body 320 and the supporting assembly 1500 may be implemented flexibly.

In some embodiments, the rotation of the second supporting component 1511 may include a one-dimensional rotation, a two-dimensional rotation, a three-dimensional rotation, etc. For example, the second supporting comment 1511 may rotate horizontally relative to the first supporting component 1512. As another example, the second supporting comment 1511 may translate and rotate relative to the first supporting component 1512. In some embodiments, the second supporting component 1511 and the first supporting component 1512 may collectively form a coaxial structure. The second supporting component 1511 may rotate along the concentric axis of the second supporting component 1511 and the first supporting component 1512.

Figure 17:
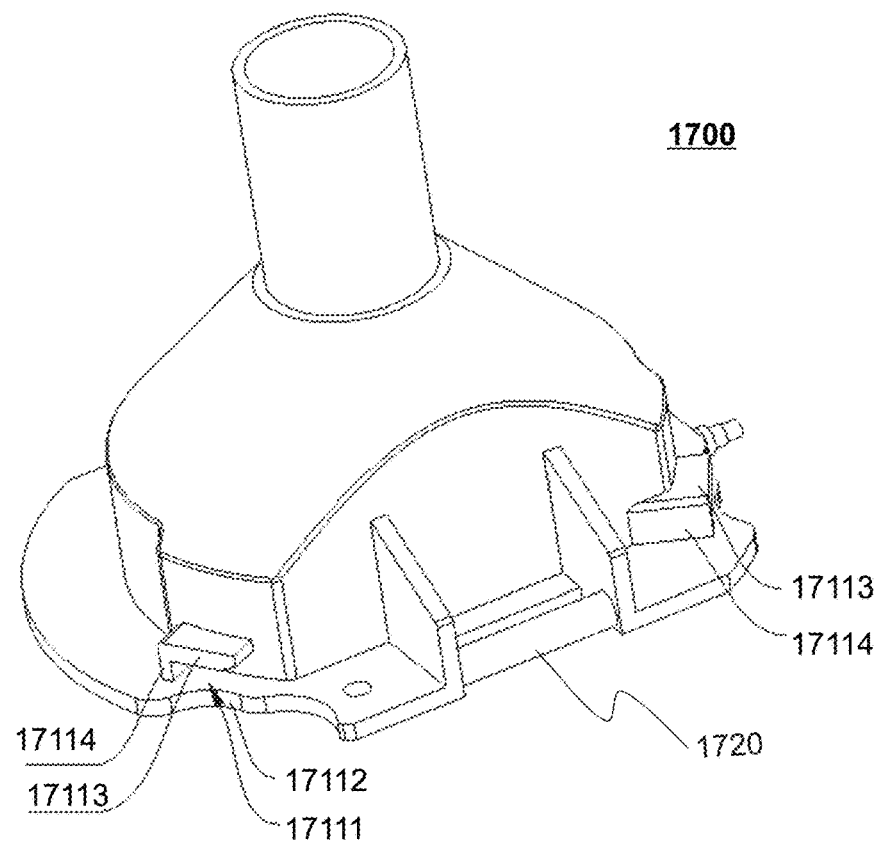
FIG. 17 illustrates a second exemplary supporting component of the exemplary supporting assembly in FIG. 15 according to some embodiments of the present disclosure.

As shown in FIGS. 15-16, the first supporting component 1512 may include the guide protrusions 15121. The second supporting component 1511 may include the guide grooves. In some embodiments, one of the guide protrusions 15121 may be fitted into different guide grooves in different orientations of the second supporting component 1511 relative to the first supporting component 1512, respectively. The second supporting component 1511 may rotate with respect to the first supporting component 1512 by fitting the guide protrusion into the different guide grooves to adjust the orientation of the second supporting component 1511 relative to the first supporting component 1512. Since the camera body 320 is connected to the second supporting component 1511, the orientation of the camera body 320 may be adjusted accordingly. In some embodiments, the second supporting component 1511 may include a shaft (e.g., a shaft 1720 as shown in FIG. 17). A hook (e.g., the first hook as illustrated in FIGS. 3-4, 6A, 7-9, and 13-14) may be hooked at the shaft. The camera body 320 may be adjusted to an orientation where the shaft is kept at a distance away from the fixed object.

In some embodiments, a guide protrusion may first fit into a first guide groove of the guide grooves. The guide protrusion may fit into a second guide groove by rotating the second supporting component 1511 by a certain angle. Thus, the orientation of the second supporting component 1511 relative to the first supporting component 1512 may change. In some embodiments, the first supporting component 1512 may be sleeved on the second supporting component 1511. The second supporting component 1511 may be detached from the first supporting component 1512 when the guide protrusion is withdrawn from the first guide groove. The guide protrusion may fit into the second guide groove by rotating the second supporting component 1511 by the certain angle. Then, the first supporting component 1512 may be connected to the second supporting component 1511 again, and the orientation of the second supporting component 1511 relative to the first supporting component 1512 is changed. In some alternative embodiments, the second supporting component 1511 may not be detached from the first supporting component 1512 during the rotation of the second supporting component 1511. The guide protrusion may fit into the second guide groove by directly rotating the second supporting component 1511 when the first supporting component 1512 is sleeved on the second supporting component 1511.

For illustration purposes, the second supporting component 1511 may include a first guide groove and a second guide groove. The first supporting component 1512 may include a first guide protrusion and a second guide protrusion. The first guide protrusion and the second guide protrusion may fit into the first guide groove and the second guide groove, respectively. The second supporting component 1511 may be detached from the first supporting component 1512 when the first guide protrusion and the second guide protrusion are withdrawn from the first guide groove and the second guide groove, respectively. The second guide protrusion may fit into the first guide groove, and the first guide protrusion may fit into the second guide groove by rotating the second supporting component 1511 by a certain angle. The second supporting component 1511 may be connected to the first supporting component 1512 again, and the orientation the second supporting component 1511 relative to the first supporting component 1512 may change. In some embodiments, the second supporting component 1511 may not be detached from the first supporting component 1512. The second guide protrusion may fit into the first guide groove, and the first guide protrusion may fit into the second guide groove by rotating the second supporting component 1511 when the first supporting component 1512 is sleeved on the second supporting component 1511.

In some embodiments, the guide protrusions 15121 may be spaced from each other along a circumferential direction of the inner wall of the first supporting component 1512. The guide grooves may be spaced from each other along a circumferential direction of the outer wall of the second supporting component 1511. In some embodiments, the guide protrusions 15121 may be evenly spaced from each other along the circumferential direction of the first supporting component 1512. That is, a circumferential or spherical distance or a central angle between any two adjacent guide protrusions 121 may be a fixed value. The guide grooves may be evenly spaced from each other along the circumferential direction of the second supporting component 1511. A circumferential or spherical distance or a central angle between any two adjacent guide grooves may be a fixed value. For example, the second supporting component 1511 may include three guide grooves. The central angle between any two of the three guide grooves may be 120 degrees. The first supporting component 1512 may include three guide protrusions. The central angle between any two of the three guide protrusions may be 120 degrees. The fitting degree between the guide protrusions 15121 and the guide grooves may be optimal when the guide grooves and the guide protrusions 15121 are evenly spaced. For illustration purposes, a guide protrusion fitted into one of the guide grooves may be easily adjusted to fit into another guide groove when the guide grooves and the guide protrusions 15121 are evenly spaced.

In some embodiments, the number (or count) of the guide protrusions 15121 may be the same as the number (or count) of the guide grooves. The number (or count) of the guide protrusions 15121 and the guide grooves may be non-limiting, e.g., 2, 3 or more. In some embodiments, the more the number (or count) of the guide protrusions 15121 and the number (or count) of the guide grooves are, the more adjustable orientations the second supporting component 1511 may have.

It may be convenient to fabricate the supporting assembly 1500 when the first supporting component 1512 includes the guide protrusions 15121, and the second supporting component 1511 includes the guide grooves. In some alternative embodiments, without considering the convenience for fabricating the supporting assembly 1500, the first supporting component 1512 may include the guide grooves, and the second supporting component 1511 may include the guide protrusions 15121.

The supporting assembly 1500 may include at least one fastener configured to fasten the first supporting component 1512 and the second supporting component 1511. For example, the fastener(s) may include a hook, a clasp assembly, a screw, a nut, or the like, or any combination thereof. In some embodiments, the structure of the hook may be same as or similar to the structure of the second hook as illustrated in FIGS. 3-4 and 10. The structure of the clasp assembly may be same as or similar to the structure of the clasp assembly as illustrated in FIGS. 3-4.

As shown in FIGS. 15-16, the inner wall of the first supporting component 1512 may include at least one stud 15122. The stud(s) 15122 may also be referred to as boss(es). The second supporting component 1511 may include at least one hole 15115. At least one fastener may screw on the stud(s) 15122 through the hole(s) 15115, thereby strengthening the connection between the first supporting component 1512 and the second supporting component 1511, and further improving the stability of the camera device 300. The fastener(s) may include at least one screw 1513. The screw(s) 1513 may screw on the stud(s) 15122 through the hole(s) 15115. In some embodiments, after an operator completes the wire connection, he/she may further fasten the supporting assembly 1500, i.e., the first supporting component 1512 and the second supporting component 1511, via the fastener(s).

In some embodiments, the stud(s) 15122 may include multiple studs that are spaced from each other along a circumferential direction of the first supporting component 1512. Accordingly, the hole(s) 15115 may include multiple holes that are spaced from each other along a circumferential direction of the second supporting component 1511. After the guide groove(s) fits into the guide protrusion(s), the fastener(s) may screw on one or more of the multiple studs through one or more corresponding holes.

In some embodiments, the first supporting component 1512 may be coupled to the fixed object by welding, screwing, embedding, a mechanical element, etc. For example, the mechanical element may include a converter, an adaptor ring, a bolt, a screw, a nut, a gasket, an airtight glue, an airtight adhesive tape, or the like, or any combination thereof. It should be noted that the first supporting component 1512 and/or the second supporting component 1511 may be any suitable component that can connect the camera body 320 to the fixed object. For illustration purposes, the first supporting component 1512 and/or the second supporting component 1511 may include a flange, a frame, or the like, or any combination thereof. For example, the first supporting component 1512 and/or the second supporting component 1511 may include flanges. The flanges may be components that can be mechanically connected with other components (e.g., the fixed object, the camera body 320). Besides, the flanges may be relatively cheap and the cost of the camera device may be reduced. It should be noted that the first supporting component 1512 and/or the second supporting component 1511 may be used interchangeably. For example, the second supporting component 1511 may be connected to the fixed object and sleeved on the first supporting component 1512. The first supporting component 1512 may be rotatably connected to the first supporting component 1512.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments.

Figure 18:
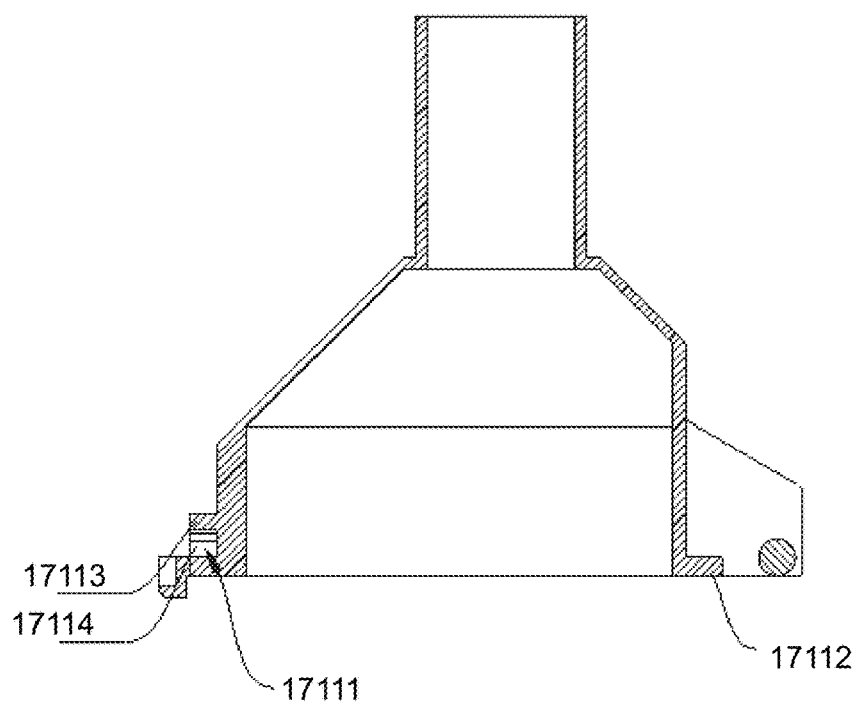
FIG. 18 illustrates a section view of the second exemplary supporting component in FIG. 17 according to some embodiments of the present disclosure.

FIG. 17 illustrates a second supporting component 1700 according to some embodiments of the present disclosure. FIG. 18 illustrates a section view of the second supporting component 1700 according to some embodiments of the present disclosure. The second supporting component 1700 may be an example of the second supporting component 1511 as illustrated in FIG. 15.

The second supporting component 1700 may include an edge 17112 and a plurality of protrusions 17113. The edge 17112 and the protrusions 17113 may extend outwardly from the outer wall of the second supporting component 1700, respectively. The edge 17112 may be relatively closer to a camera body (e.g., the camera body 320 as illustrated in FIGS. 3-9) than the protrusions 17113. The edge 17112 and a corresponding protrusion of the protrusions 17113 may form a guide groove 17111 instead of directly slotting a groove on the second supporting component 1700, thereby improving the structural stability of the second supporting component 1700. In some embodiments, the edge 17112, the protrusions 17113 and the second supporting component 1700 may be configured as an integral piece or different pieces connected with each other.

The second supporting component 1700 may include a plurality of stopper protrusions 17114. The stopper protrusions 17114 may extend outwardly from the guide grooves 17111. Each of the stopper protrusions 17114 may be located between the edge 17112 and a corresponding protrusion. Each stopper protrusion 17114 may be configured to limit the movement of a guide protrusion (e.g., the guide protrusions 15121 as illustrated in FIG. 15-16) in the guide groove 17111 to prevent the guide protrusions from sliding out of the guide grooves 17111 that causes the guide protrusions to detach from the guide grooves 17111. The stopper protrusions 17114 and the second supporting component 1700 may be configured as an integral piece or different pieces connected with each other.

In some embodiments, a first side of each of the stopper protrusions 17114 may be connected to the edge 17112. A second side of each of the stopper protrusions 17114 may be connected to a corresponding protrusion. In some alternative embodiments, the stopper protrusions 17114 may be spaced apart from the edge 17112 and/or the protrusions 17113 as long as the stopper protrusions 17114 may extend outwardly from the guide grooves 17111 and limit the movement of the guide protrusion in the guide grooves 17111.

Figure 19:
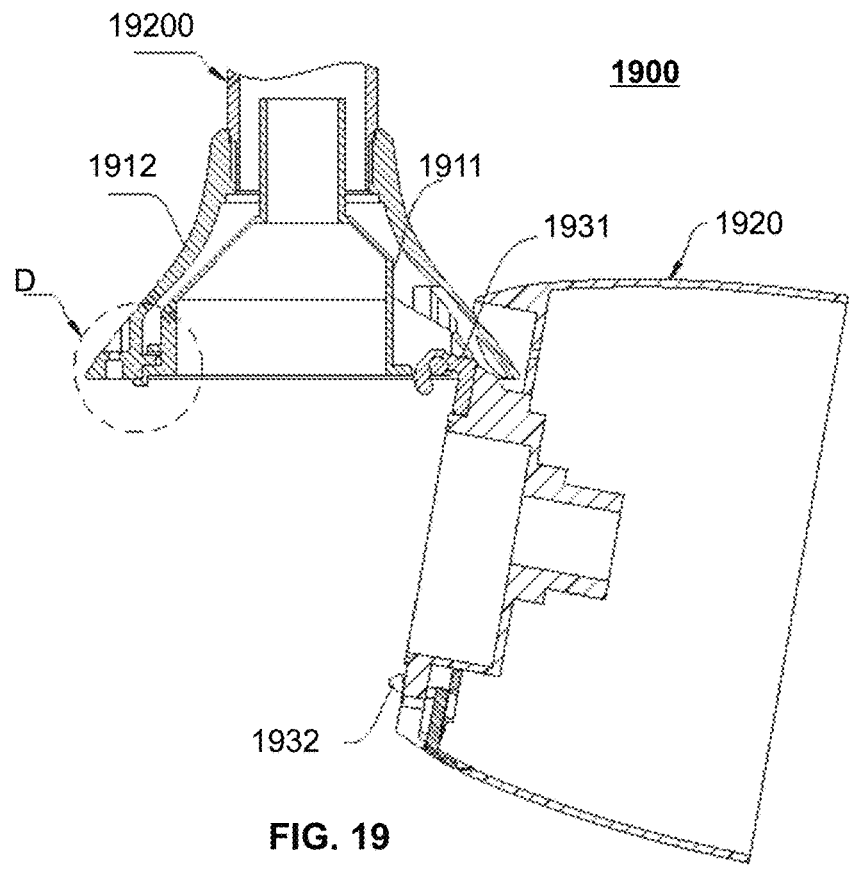
FIG. 19 illustrates an exemplary camera device according to some embodiments of the present disclosure.

FIG. 19 illustrates an exemplary camera device 1900 according to some embodiments of the present disclosure.

Figure 20:
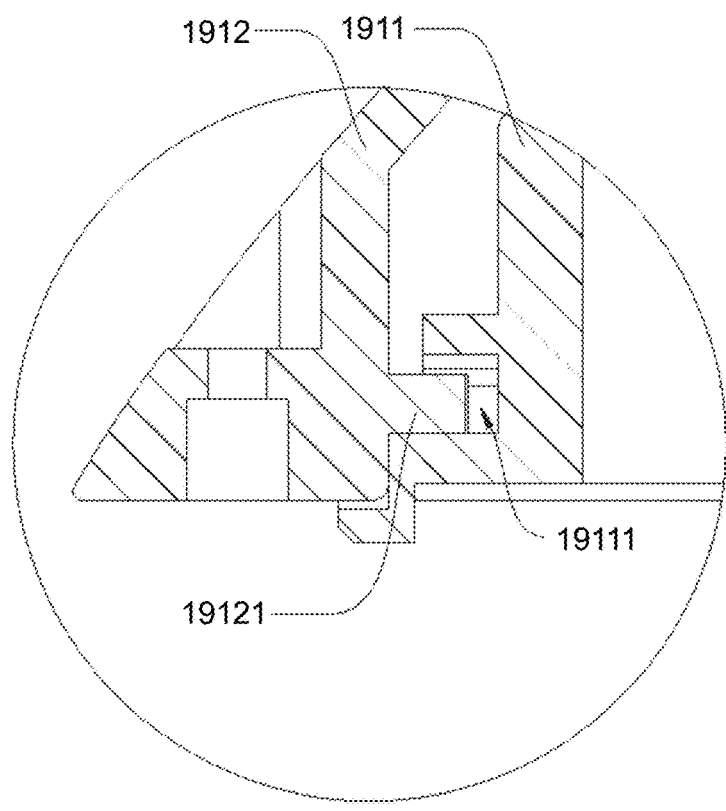
FIG. 20 illustrates an enlarged view of part D in FIG. 19 according to some embodiments of the present disclosure.

FIG. 20 illustrates an enlarged view of part D of the camera device 1900 according to some embodiments of the present disclosure.

As shown in FIGS. 19-20, the camera device 1900 may include a first supporting component 1912, a second supporting component 1911, a camera body 1920, a first hook 1931, and a second hook 1932. The first supporting component 1912 may be connected to a frame 19200. The second supporting component 1911 may be rotatably connected to the first supporting component 1912. The second supporting component 1911 may include a plurality of guide grooves 19111. The first supporting component 1912 may include a plurality of guide protrusions 19121. The second supporting component 1911 may rotate with respect to the first supporting component 1912 through the guide protrusions 19121 sliding along the guide grooves 19111. An orientation of the camera body 1920 with respect to the first supporting component 1912 may be adjustable with a rotation of the second supporting component 1911 relative to the first supporting component 1912. The camera body 1920 may suspend on the second supporting component 1911 via the first hook 1931. An operator may rotate the camera body 1920 to an orientation where the first hook 1931 is kept at a distance from an external object (e.g., the frame 19200, a wall), and further implement wire connection inside the camera body 1920. After completing the wire connection, the operator may fix the camera body 1920 and the second supporting component 1911 via the first hook 1931 and the second hook 1932.

In some embodiments, the first hook 1931 may include a groove. The second supporting component 1911 may include a protrusion. When the protrusion of the second component 1911 fits into the groove of the first hook 1931, the camera body 1920 may be secured at a position relative to the first supporting component 1912. In some embodiments, the first hook 1931 may be same as or similar to the first hook 331 as illustrated in FIGS. 3-4, 6A, 7-9, and 13-14.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A camera device, comprising:
a camera body configured to accommodate a lens;
a supporting component configured to fix the camera body at a first position relative to the supporting component where the lens works under a normal condition, wherein the supporting component includes a protrusion; and
a limiting component mechanically coupled between the camera body and the supporting component, the limiting component comprising a first hook between the camera body and the supporting component, wherein the first hook comprising a bent part and a connecting part connected to the bent part, the first hook including a groove which is located at the bent part, the limiting component being configured to secure the camera body at a second position relative to the supporting component by fitting the protrusion into the groove, the second position relative to the supporting component being different from the first position relative to the supporting component, wherein the bent part of the first hook is rotatably connected to the first supporting component by withdrawing the groove located at the bent part from the protrusion of the first supporting component.

2. The camera device of claim 1, wherein:
the connecting part of the first hook is located at the camera body; and
the bent part of the first hook is fixedly connected to the supporting component by fitting the protrusion into the groove.

3. The camera device of claim 1, wherein the groove is withdrawn from the protrusion by uplifting the camera body.

4. The camera device of claim 1, further comprising at least one fastener configured to fasten the camera body at the first position relative to the supporting component.

5. The camera device of claim 4, the at least one fastener comprising at least one second hook, wherein:
the at least one second hook is detachably connected to the camera body or the supporting component by gluing, screwing, or a mechanical element.

6. The camera device of claim 5, each of the at least one second hook comprising a bent part and a connecting part connected to the bent part, wherein:
the bent part of each of the at least one second hook is detachably connected to the camera body or the supporting component.

7. The camera device of claim 6, wherein:
the bent part of each of the at least one second hook is detachably connected to the supporting component; and
the connecting part of each of the at least one second hook is located at the camera body.

8. The camera device of claim 6, each of the at least one second hook comprising an elastic component, wherein:
the elastic component is located between the connecting part of each of the at least one second hook and the camera body; and
the elastic component is configured to facilitate the connecting part of each of the at least one second hook to detachably connect to the supporting component.

9. The camera device of claim 8, each of the at least one second hook comprising a plate, wherein:
the plate is located between the connecting part of each of the at least one second hook and the camera body,
a first side of the elastic component is located at the camera body; and
a second side of the elastic component is connected to the plate, thereby reducing friction between each of the at least one second hook and the camera body.

10. A surveillance system, comprising a camera device, wherein the camera device includes:
a camera body configured to accommodate a lens;
a supporting component configured to fix the camera body at a first position relative to the supporting component where the lens works under a normal condition, wherein the supporting component includes a protrusion; and
a limiting component mechanically coupled between the camera body and the supporting component, the limiting component comprising a first hook between the camera body and the supporting component, wherein the first hook comprising a bent part and a connecting part connected to the bent part, the first hook including a groove which is located at the bent part, the limiting component being configured to secure the camera body at a second position relative to the supporting component by fitting the protrusion into the groove, the second position relative to the supporting component being different from the first position relative to the supporting component, wherein the bent part of the first hook is rotatably connected to the first supporting component by withdrawing the groove located at the bent part from the protrusion of the first supporting component.

11. A camera device, comprising:
a camera body configured to accommodate a lens;
a supporting assembly configured to facilitate connection between the camera body and a fixed object, the supporting assembly comprising:
  a first supporting component connected to the fixed object; and
  a second supporting component rotatably connected to the first supporting component, wherein the camera body is mechanically connected to the second supporting component such that an orientation of the camera body with respect to the first supporting component is adjustable with a rotation of the second supporting component relative to the first supporting component;
wherein the supporting assembly comprises a plurality of guide protrusions and a plurality of guide grooves, the second supporting component rotates with respect to the first supporting component through the plurality of guide protrusions sliding along the plurality of guide grooves.

12. The camera device of claim 11, wherein:
the plurality of guide protrusions are spaced from each other along a circumferential direction of the first supporting component; and
the plurality of guide grooves are spaced from each other along a circumferential direction of the second supporting component.

13. The camera device of claim 12, the second supporting component comprising a shaft, and the camera device comprising a first hook, wherein:
  the first hook is configured to connect the camera body to the second supporting component;
  the first hook is hooked at the shaft of the second supporting component; and
  the camera body is adjusted to an orientation where the shaft is kept at a distance away from the fixed object.

14. The camera device of claim 12, wherein the second supporting component includes at least one stopper protrusion configured to limit a movement between the plurality of guide protrusions and the plurality of guide grooves.

15. The camera device of claim 11, wherein the camera device includes at least one fastener configured to fasten the first supporting component and the second supporting component.

16. The camera device of claim 11, the camera body comprising a chamber configured to accommodate a portion of the first supporting component.

* * * * *